(12) United States Patent
Shrader et al.

(10) Patent No.: US 12,410,069 B2
(45) Date of Patent: *Sep. 9, 2025

(54) WASTEWATER PROCESSING

(71) Applicant: M2 Water Solutions LLC, Indianapolis, IN (US)

(72) Inventors: Martin Shrader, Indianapolis, IN (US); Merrill Reece, Jr., Indianapolis, IN (US); Anthony Haag, Brownsburg, IN (US); Paul Kite, Zionsville, IN (US)

(73) Assignee: M2 Water Solutions, LLC, Indianapolis, IN (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/956,209

(22) Filed: Sep. 29, 2022

(65) Prior Publication Data
US 2023/0028512 A1 Jan. 26, 2023

Related U.S. Application Data

(60) Continuation-in-part of application No. 17/093,511, filed on Nov. 9, 2020, now Pat. No. 11,479,479, which is a continuation-in-part of application No. 17/069,005, filed on Oct. 13, 2020, now Pat. No. 11,401,173, which is a division of application No. 16/192,083, filed on Nov. 15, 2018, now Pat. No. 10,807,884.

(60) Provisional application No. 62/933,416, filed on Nov. 9, 2019, provisional application No. 62/933,414, filed on Nov. 9, 2019.

(51) Int. Cl.
*C02F 1/04* (2023.01)
*B01D 1/00* (2006.01)
*B01D 1/16* (2006.01)

(52) U.S. Cl.
CPC ............ *C02F 1/048* (2013.01); *B01D 1/0058* (2013.01); *B01D 1/0082* (2013.01); *B01D 1/16* (2013.01)

(58) Field of Classification Search
CPC ..... C02F 1/048; B01D 1/0058; B01D 1/0082; B01D 1/16
See application file for complete search history.

(56) References Cited

U.S. PATENT DOCUMENTS

| | | | | |
|---|---|---|---|---|
| 3,212,559 A | * | 10/1965 | Williamson | B01D 3/06 159/13.4 |
| 4,045,314 A | | 8/1977 | Rod et al. | |
| 4,838,184 A | | 6/1989 | Young | |
| 5,183,577 A | | 2/1993 | Lehmann | |
| 5,207,869 A | * | 5/1993 | Harmoning | B01D 1/0082 159/901 |

(Continued)

OTHER PUBLICATIONS

Webpage for Colaris Thermal Process Technology. https://caloris.com/caloris-agilix-mobile-evaporator/. Accessed Feb. 18, 2019 online.

*Primary Examiner* — Jonathan Miller
(74) *Attorney, Agent, or Firm* — Indiano Law Group LLC; E. Victor Indiano; John T. Woods, III

(57) ABSTRACT

A wastewater processing method includes introducing wastewater into an upper region of a chamber. The chamber remains at substantially atmospheric pressure. A portion of the wastewater in the chamber is vaporized. Flame is introduced into the chamber and provides for the ignition of a volatile organic compound. The vaporized portion of the wastewater is vented to the atmosphere.

12 Claims, 16 Drawing Sheets

(56) References Cited

U.S. PATENT DOCUMENTS

| | | | |
|---|---|---|---|
| 5,256,251 | A | 10/1993 | Holcombe |
| 5,934,207 | A * | 8/1999 | Echols .................... F23G 7/008 |
| | | | 110/345 |
| 6,623,645 | B1 | 9/2003 | Road et al. |
| 6,887,344 | B1 | 5/2005 | VanKouwenberg |
| 7,228,682 | B2 | 6/2007 | Kashler |
| 7,448,600 | B1 | 11/2008 | Boulter |
| 7,604,710 | B2 | 10/2009 | Haslem et al. |
| 7,681,643 | B2 | 3/2010 | Heins |
| 7,722,739 | B2 | 5/2010 | Haslem et al. |
| 8,211,303 | B2 | 7/2012 | Page et al. |
| 8,216,468 | B2 | 7/2012 | Page et al. |
| 8,256,748 | B1 | 9/2012 | Boulter |
| 8,282,772 | B2 | 10/2012 | Jepson |
| 8,343,310 | B2 | 1/2013 | Fielding et al. |
| 8,425,668 | B2 | 4/2013 | Lakatos et al. |
| 8,470,139 | B2 | 6/2013 | Booth |
| 8,679,291 | B2 | 3/2014 | Duesel, Jr. et al. |
| 8,764,947 | B2 | 7/2014 | Tang et al. |
| 8,877,690 | B2 | 11/2014 | Keister |
| 8,906,203 | B2 | 12/2014 | Ugolin |
| 9,446,974 | B2 | 9/2016 | Milner et al. |
| 9,580,343 | B2 | 2/2017 | Keister |
| 9,770,671 | B2 | 9/2017 | Curlett |
| 10,092,851 | B2 | 10/2018 | Dighe |
| 10,807,884 | B2 * | 10/2020 | Shrader ................ B01D 1/0082 |
| 11,401,173 | B2 * | 8/2022 | Shrader ................ B01D 1/0058 |
| 11,479,479 | B2 * | 10/2022 | Shrader .................... B01D 1/16 |
| 2011/0140457 | A1 | 6/2011 | Lakatos et al. |
| 2012/0247942 | A1 | 10/2012 | Curlett |
| 2016/0045841 | A1* | 2/2016 | Kaplan .................. C01B 32/05 |
| | | | 429/49 |
| 2017/0282084 | A1 | 10/2017 | Wan et al. |
| 2017/0282094 | A1 | 10/2017 | Wan |

\* cited by examiner

WASTEWATER PROCESSING

CROSS-REFERENCE TO RELATED APPLICATIONS

This application is a continuation-in-part of U.S. application Ser. No. 17/093,511, filed Nov. 9, 2020, and entitled "Wastewater Processing", which is a continuation-in-part of U.S. application Ser. No. 17/069,005 (filed Oct. 13, 2020, and having issued as U.S. Pat. No. 11,401,173), which is a divisional of U.S. application Ser. No. 16/192,083 (filed Nov. 15, 2018 and having issued as U.S. Pat. No. 10,807, 884), claims the benefit of U.S. Provisional Application No. 62/933,416 (filed Nov. 9, 2019, and entitled "Quick Change Nozzle System for Water Processing System and Method for Quickly Changing and Maintaining Nozzles in a Process Spray System"), and claims the benefit of U.S. Provisional Application No. 62/933,414 (filed Nov. 9, 2019, and entitled "Remotely Monitored and Controlled Wastewater Processing at Atmospheric Pressure and Method for Remotely Monitoring and Controlling a Wastewater Processing System"), the entireties of which are incorporated by reference herein.

TECHNICAL FIELD OF THE INVENTION

The present application relates to wastewater and more particularly, but not exclusively, to wastewater processing.

BACKGROUND

Various agricultural and industrial processes result in the production of wastewater. For example, wastewater is often generated as a byproduct of oil and gas production, textile production, mining and mineral production, etc.

The oil and gas industry utilizes water for a variety of tasks and generates a significant amount of wastewater. For example, water may be injected into a well to re-pressurize a reservoir, water may be pumped from a well in the process of extracting oil or gas, and water may be used to deliver proppants to underground fractures. During such uses, various hydrocarbons (which can include crude oil as well as various fats and other oils), heavy metals, various volatile organic compounds, various other noxious compounds, and various solids are dissolved by and/or introduced into the water. This contaminated water is referred to as "wastewater" typically cannot be directly released back into the environment due to the noxious compounds therein.

Significant operational costs are incurred by oil and gas producers related to the disposal or re-use of such wastewater. Many other high-volume wastewater generators face similar significant operational costs for disposal of wastewater.

Wastewater processing often involves one or more unit operations, such as distillation, evaporation, filtration, and vaporization, to reduce the total volume of wastewater (e.g., by reducing the amount of water present in the wastewater). Distillation is an energy-intensive process that frequently requires large distillation columns. Filtration may require frequent filter changes to keep the system operating at the desired contaminant levels. Vaporization can require various pre-conditioning and high-pressure operations.

Many wastewater processing units are large, fixed installations which are not suitable for mid-volume locations or remote locations. Such wastewater processing units can be very expensive. Wastewater is often transported from remote locations, often over long distances, for processing and/or disposal. The costs associated with the transportation and disposal of wastewater can add significantly to the production costs of the underlying business producing the wastewater.

Additionally, some evaporative and vaporization wastewater processing units of the prior art have been known to release various noxious compounds into the air (e.g., such as volatile organic compounds) during the evaporative and vaporization processes. Due to the numerous drawbacks of processing and disposal systems of the prior art, further technological developments are desirable in this area.

SUMMARY

One embodiment of the present application includes a wastewater processing method. This method includes introducing wastewater into an upper region of a chamber. The chamber remains at substantially atmospheric pressure. A portion of the wastewater is vaporized in the chamber. Flame is introduced into the chamber. A volatile organic compound is ignited. This ignition can be due to the interaction of the flame with the volatile organic compound. The vaporized portion of the wastewater is vented.

The method can include introducing the flame into a lower region of the chamber. A vaporization medium can be provided in the upper region of the chamber. Introducing wastewater into the upper region of the chamber can include directing wastewater toward the vaporization medium.

The method can include providing a permeable substrate between the upper region and the lower region. The vaporization medium can be a plurality of pall rings.

The method can include vaporizing a substantial portion of the wastewater as the wastewater moves downwardly through the upper region. The flame can be directed into a lower region of the chamber and the flame can contact un-vaporized droplets of the wastewater as the un-vaporized droplets move downwardly through the lower region.

Introducing flame into the chamber can include introducing flame into the chamber at a temperature between 500° F. to 3500° F. The method can include collecting an un-vaporized portion of the wastewater in a lower region of the chamber.

The method can include introducing the flame into the lower region of the chamber. The flame can be directed toward an upper surface of the collected un-vaporized portion of the wastewater so that the flame contacts the upper surface of the collected un-vaporized portion. The lower chamber can be an expansion chamber for the flame (e.g., the lower chamber provides a sufficient volume for the flame to expand, and the lower chamber can provide a sufficient volume for the fuel which is generating the flame to combust). A blower can introduce air into the lower chamber.

The method can include determining a current concentration of a waste within the un-vaporized portion of wastewater. The waste can include at least one of dissolved solids, suspended solids, and volatile organic compounds (e.g., the waste can include dissolved solids, suspended solids, and/or volatile organic compounds). The current concentration can be compared with a predetermined threshold concentration. In response to the current concentration being equal to or greater than the predetermined threshold concentration, the method can include disposing of the collected un-vaporized portion.

In response to the current concentration being lower than the predetermined threshold concentration, the method can include introducing the collected un-vaporized portion into the upper region of the chamber as wastewater (e.g., the collected un-vaporized liquid can be circulated through the chamber until the amount of waste present within the collected un-vaporized liquid is equal to or greater than the predetermined threshold concentration). In this manner, much of the water present within the wastewater can be removed from the wastewater, and a concentrated liquid waste (e.g., having a significantly reduced volume relative a volume of raw wastewater which was introduced into the chamber) can be disposed of.

Another embodiment of the present application is directed to an apparatus. This apparatus includes a chamber having an outer wall. A wastewater introduction port is located at an upper portion of the chamber. The wastewater introduction port is configured to release wastewater into the upper portion. A burner is placed in flow communication with the chamber, and the burner is configured to generate flame to be introduced into the chamber. A portion of the wastewater is vaporized in the upper chamber.

The flame can be introduced into the lower portion of the chamber. The flame can have a temperature in the range of 500° F. to 3500° F., when the flame is introduced into the lower portion. The flame can interact with at least one volatile organic compound in the chamber to ignite and incinerate the at least one volatile organic compound.

A permeable substrate can be located between the upper portion and the lower portion. The upper portion can be an upper region, the lower portion can be a lower region, and a vaporization medium can be located in the upper region. The wastewater introduction port can be configured to expel the wastewater toward the vaporization medium.

A vent can be placed in flow communication with the upper region of the chamber, and the portion of vaporized wastewater can be vented to the atmosphere via the vent. The chamber can remain at substantially atmospheric pressure.

A burner tube can extend from the burner through the upper region and toward the lower region (e.g., a first end of the burner tube can be flowably coupled with an outlet of the burner and a second end of the burner tube can terminate at the lower region, and the burner tube can extend through the upper region). The upper region is defined between the outer wall of the chamber and an outer wall of the burner tube. The lower region of the chamber can be configured to collect un-vaporized wastewater. The burner tube can be configured to direct the flame downwardly at a surface of the collected un-vaporized wastewater, and the flame can contact the surface of the collected un-vaporized wastewater.

A vaporization medium can be located in the upper portion of the chamber. The flame can be introduced into the lower portion of the chamber and the lower portion can be configured to serve as an expansion chamber for the flame. The fuel generating the flame can be fully combusted and converted into heated exhaust gas in the lower portion. The heated exhaust gas can be directed upwardly toward the vaporization medium and can flow through the vaporization medium.

A substantial portion of the wastewater can be vaporized in the upper portion. Un-vaporized droplets of the wastewater can move downwardly from the upper portion into the lower portion and the flame can contact the un-vaporized droplets as they move downwardly in the lower portion.

Yet another embodiment of the present application is directed to a method that includes introducing wastewater into an upper portion of a chamber and vaporizing a substantial portion of the wastewater. The method includes igniting a volatile compound that was released from the wastewater during the vaporizing. The method includes venting the vaporized portion of the wastewater to the atmosphere.

The volatile compound can be a volatile organic compound. The method can include introducing flame into a lower portion of the chamber, and the flame can be configured to be an ignition source for the volatile organic compound.

The method can include introducing flame into a lower portion of the chamber. The flame can include a temperature selected from the range of 1000° F. to 2500° F., when introduced into the lower portion. The lower portion of the chamber can be an expansion chamber for the flame.

The method can include maintaining the chamber at substantially atmospheric pressure. An un-vaporized portion of the wastewater can be collected in the lower portion of the chamber. The flame can be directed downwardly toward a surface of the collected un-vaporized wastewater and the flame can contact the surface of the collected un-vaporized wastewater. A fuel which feeds the flame (e.g., the fuel which is combusting and generating the flame) can be combusted and converted into heated exhaust gas in the lower portion of the chamber. The heated exhaust gas can flow upwardly toward the upper portion of the chamber.

A vaporization medium can be provided in the upper portion of the chamber. Introducing wastewater into an upper portion of a chamber can include spraying the wastewater upon the vaporization medium. The method can include flowing the heated exhaust gas upwardly through the vaporization medium. The substantial portion of the wastewater can be vaporized at the vaporization medium (e.g., a substantial portion of the wastewater can be vaporized in, on, or near the vaporization medium as the wastewater moves downwardly through the vaporization medium and the heated exhaust gas flows upwardly through the vaporization medium).

Other embodiments include unique wastewater processing apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

Figure 1:
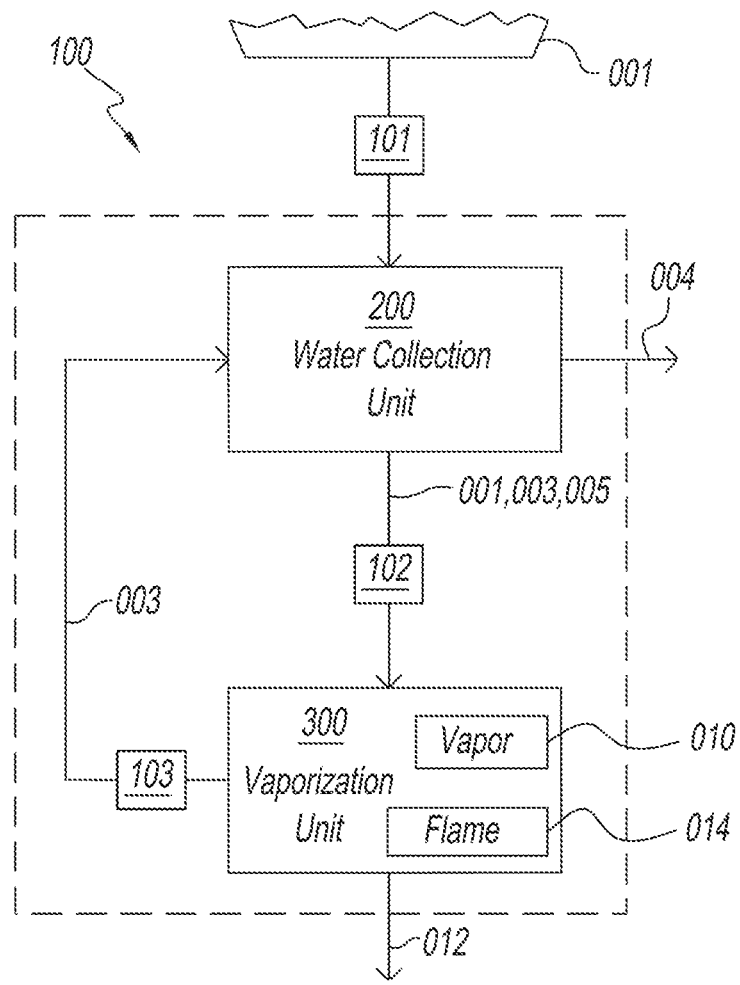
FIG. 1 is a schematic block diagram of an exemplary wastewater processing system.

The accompanying drawings incorporated in and forming a part of the specification illustrate various forms and features of the present application; however, the present application should not be construed as being limited to those specific embodiments depicted in the drawings.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

"Wastewater" typically includes one or more noxious and/or aromatic compounds and can be generated from a variety of sources. The wastewater processing systems and methods of the present application can be utilized to process wastewater which has been generated during the production of oil and/or gas. In addition to water itself, wastewater from oil and gas production is typically characterized by the presence of hydrocarbons (which can include crude oil as well as various lubricating oils, fats, and other oils), heavy metals, various volatile organic compounds, and other noxious and/or aromatic compounds.

However, it is also contemplated that the teachings of the present application can be utilized to process agricultural wastewater, wastewater produced by various mining and mineral processing operations, landfill leachate wastewater, wastewater generated by healthcare facilities, wastewater generated by various manufacturing processes, agricultural wastewater, as well as other wastewater as would be known to a person of skill. "Unprocessed wastewater" or "raw wastewater" can refer to wastewater which has been generated but which has not yet been subject to processing and/or treatment.

FIG. 1 is a schematic block diagram generally illustrating an exemplary wastewater processing system 100 in accordance with a first form of the present application. The wastewater processing system 100 will be described as processing raw wastewater 001 which has been generated by the oil and gas industry. It is believed that raw wastewater 001 produced by the oil and gas industry will typically not require filtration and/or screening prior to introducing the raw wastewater 001 into the wastewater processing system 100. However, depending upon the type and size of solids present within the raw wastewater 001, which may depend upon the source which generated the raw wastewater 001, it may be desirable to utilize various filtration and/or screening processes (not shown) as are known, prior to introducing the raw wastewater 001 into the wastewater processing system 100.

The wastewater processing system 100 is depicted as including a water collection unit 200 which is in fluid communication with vaporization unit 300. Raw wastewater 001 can be transferred into water collection unit 200 with a feed pump 101. The raw wastewater 001 is transferred from the water collection unit 200 to be dispensed into vaporization unit 300. The raw wastewater 001 can be continuously dispensed into the vaporization unit 300 with a pump 102.

A portion of the raw wastewater 001 is vaporized in the vaporization unit 300, creating vapor 010. The vaporization unit 300 utilizes heat to vaporize the portion of the raw wastewater 001. In some forms, this vapor 010 can exit from the vaporization unit 300 to be released into the atmosphere exterior to the wastewater processing system 100.

As will be described herein, the vaporization unit 300 can take a number of forms, which include but are not limited to those forms described with regard to vaporization systems 009, 011, and/or 900. The vaporization unit 300 can include an ignition source which is configured to interact with one or more of the hydrocarbons, volatile organic compounds, noxious compounds, and/or aromatic compounds present within the raw wastewater 001 and/or the vapor 010. This ignition source can be flame 014. The flame 014 is the combusting portion of an ignited fuel.

It is believed that the introduction of flame 014 into the vaporization unit 300 can result in the ignition and combustion of some of the hydrocarbons, volatile organic compounds, and/or other noxious compounds within the vapor 010. The incineration of the hydrocarbons and volatile organic compounds in the vapor 010 results in the production of exit vapor 012. The exit vapor 012 can have a substantially reduced concentration of volatile organic compounds and hydrocarbons relative the vapor 010. The exit vapor 012 is released into the atmosphere exterior to the wastewater processing system 100.

The flame 014 can also be the source of heat for the vaporization unit 300 (e.g., the flame 014 can generate the heat utilized to vaporize the portion of the raw wastewater 001).

A portion of the first aliquot of raw wastewater 001 that is not vaporized (i.e., un-vaporized wastewater 003) collects in the vaporization unit 300. In the vaporization unit 300, the un-vaporized wastewater 003 continues to be exposed to heat. In various forms, hot air or the flame 014 may be directed toward the un-vaporized wastewater 003 and the hot air or flame 014 can contact a surface of the un-vaporized wastewater 003, as will be described herein. The un-vaporized wastewater 003 can be heated and at least partially vaporized by the hot air or flame 014. In one non-limiting form, the hot air or flame 014 provides sufficient heat to boil the un-vaporized wastewater 003 in the vaporization unit 300. The absorption of heat by un-vaporized wastewater 003 can reduce the maximum temperature to which various components of the vaporization unit 300 are subjected to during operation.

When the un-vaporized wastewater 003 reaches a threshold level within the vaporization unit 300, the un-vaporized wastewater 003 can be transferred via a pump 103 into the water collection unit 200 where it at can at least partially mix with the raw wastewater 001 already present therein. The resulting combined wastewater 005 can be dispensed in a continuous stream from water collection unit 200 into the vaporization unit 300 via pump 102, where some of the wastewater 005 is vaporized into vapor 010. As is illustrated, raw wastewater 001, un-vaporized wastewater 003, and/or combined wastewater 005 can be dispensed into the vaporization unit 300. As was discussed herein, vapor 010 can be released into the atmosphere or the vaporization unit can include an ignition source to convert vapor 010 into vapor 012 (e.g., by providing for the ignition and combustion of some of the hydrocarbons and volatile organic compounds therein).

The vaporization unit 300 remains at substantially atmospheric pressure (e.g., substantially atmospheric pressure can range from around −15 PSIG to around 30 PSIG). The vaporization unit 300 preferably does not include a pressure vessel.

The combined wastewater 005 that was not vaporized can collect in the vaporization unit 300 as un-vaporized wastewater 003, where it can be further exposed to heat and recycled to the water collection unit 200. The wastewater processing system 100 can continue to recirculate the wastewater 003, 005 (e.g., transferring the un-vaporized wastewater 003 to the water collection unit and dispensing combined wastewater 005 into the vaporization unit 300) until one or more of the following criteria are met: 1.) until the combined wastewater 005 or un-vaporized wastewater 003 contains a predetermined concentration of total dissolved solids TDS, total suspended solids TSS, hydrocarbons, volatile organic compounds VOCs, and/or other noxious compounds; 2.) until a predetermined amount of time has passed; 3.) until the source of available raw wastewater 001 is depleted; 4.) until only a minimum amount of combined wastewater 005 remains; or 5.) until other criteria are met as will occur to those skilled in the art. Preferably, the system 100 can be highly automated so that only minimal user intervention may be required during processing.

The processed liquid waste 004 can then be removed from the system 100 for disposal. As will be appreciated to a person of skill, this processed liquid waste 004 has a substantially reduced overall volume than the volume of raw wastewater 001 which the processed liquid waste 004 was extracted from (e.g., as the vaporization unit 300 vaporized and removed much of the water from the raw wastewater 001). This processed liquid waste 004 can include a higher concentration of TDS, TSS, heavy metals, and other noxious compounds, than the raw wastewater 001 (e.g., as the concentration was diluted by the water present in the raw wastewater 001).

If additional wastewater is to be processed, another batch of raw wastewater 001 may be transferred into wastewater processing system 100 via water collection unit 200 for processing as described above. The further addition of raw wastewater 001 may be repeated as needed until the raw wastewater 001 to be processed is depleted.

Figure 2:
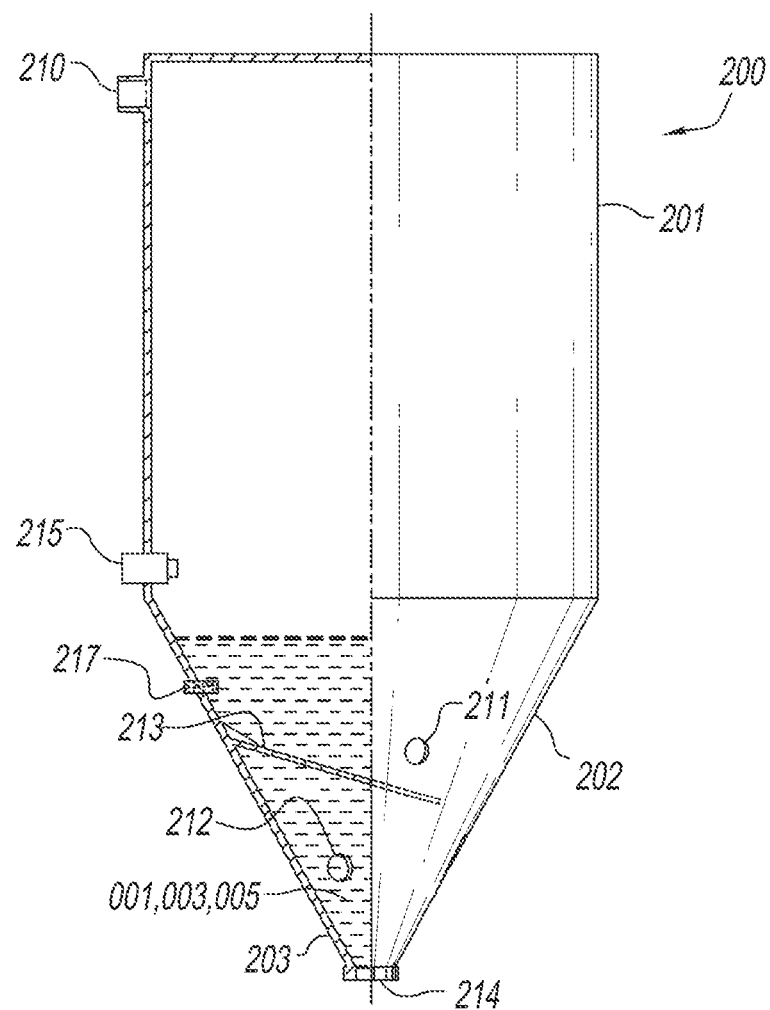
FIG. 2 is a schematic cross-sectional view of an exemplary wastewater collection system, shown with the pall rings removed.
Figure 3A:
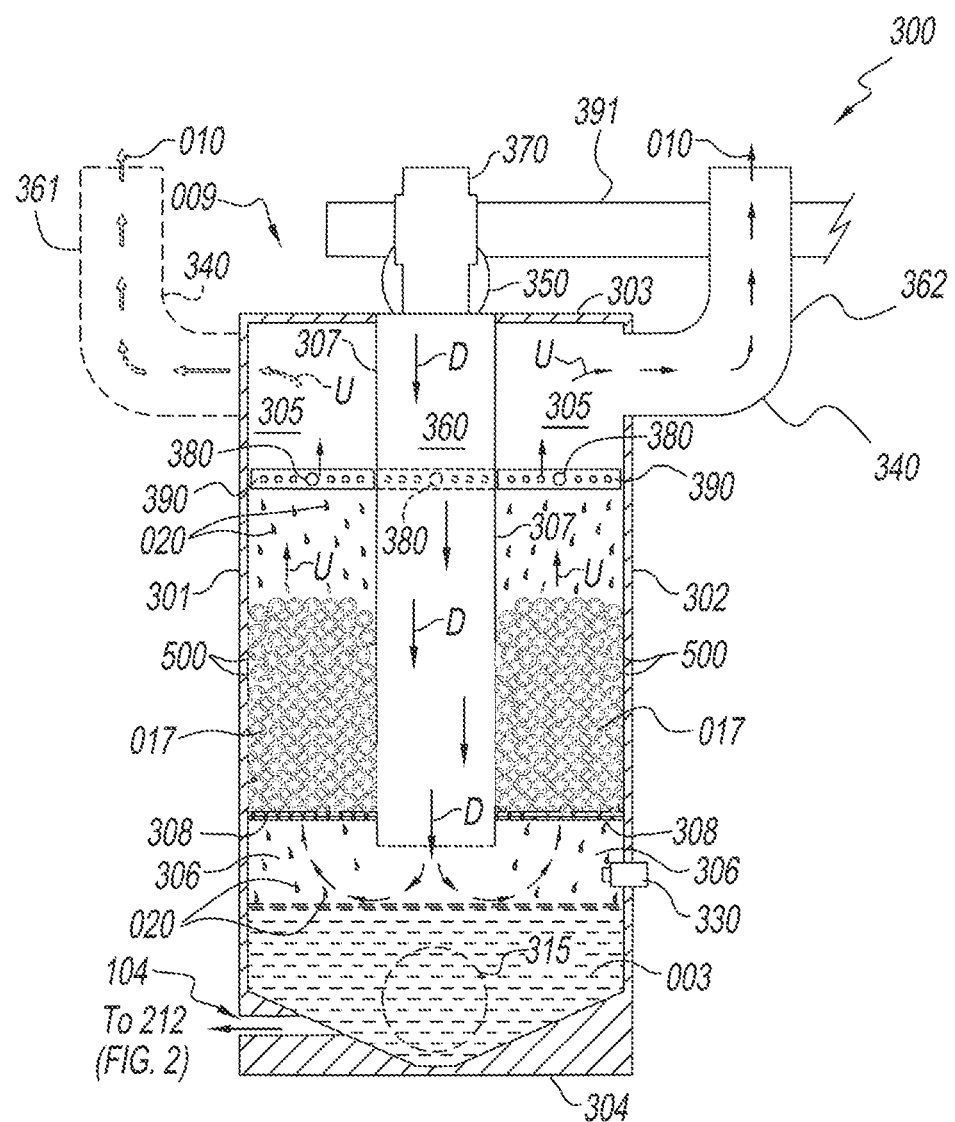
FIG. 3A is a schematic cross-sectional view of an exemplary vaporization system.
Figure 3B:
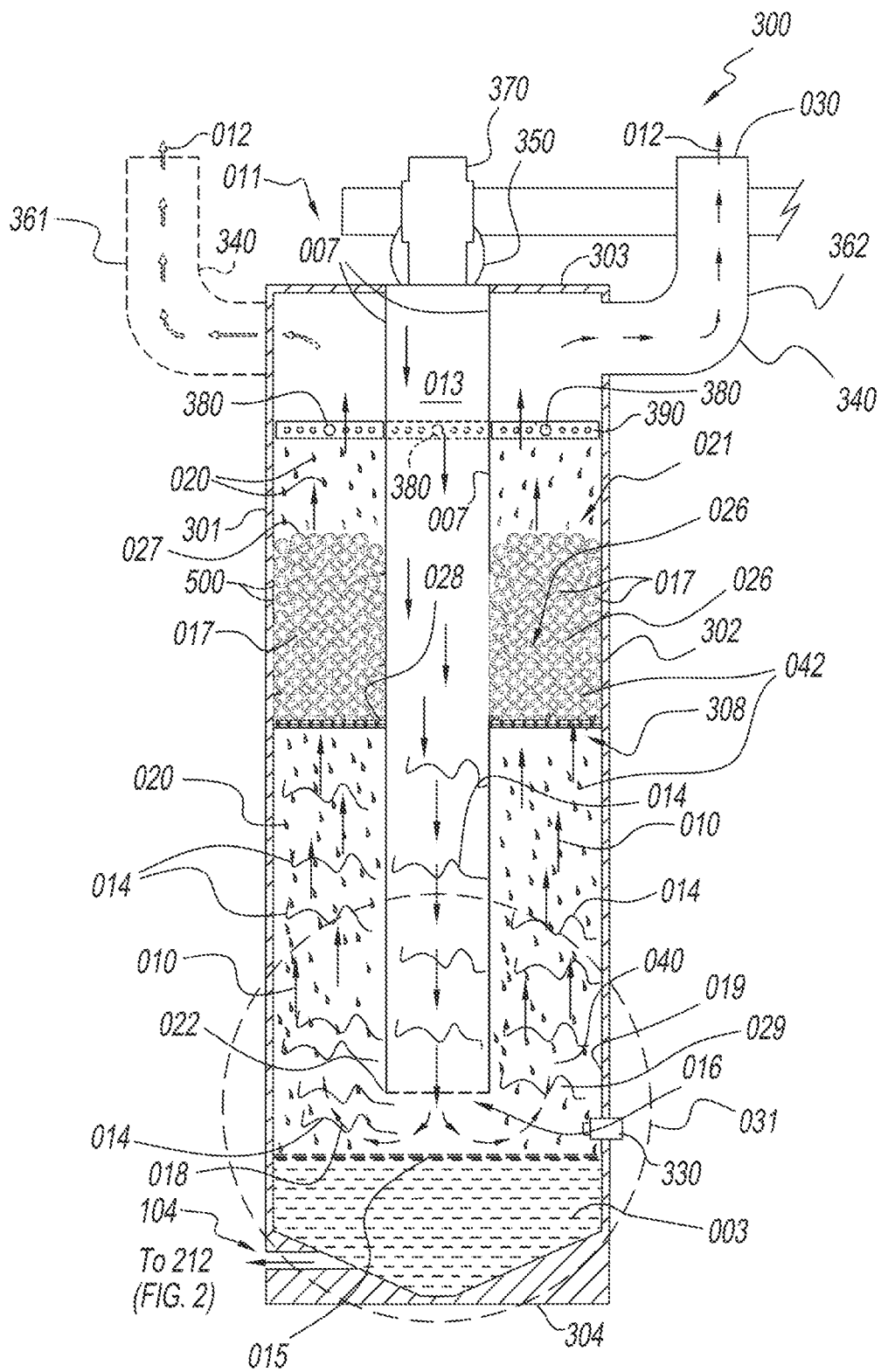
FIG. 3B is a schematic cross-sectional view of another exemplary vaporization system, with flame introduced into a lower region.

FIG. 2 depicts an exemplary water collection unit 200. The water collection unit 200 can serve as a feed tank from which wastewater 001, 005 can be supplied to the vaporization unit 300. The water collection unit 200 collects raw wastewater 001 to be processed. The water collection unit 200 can receives aliquots of un-vaporized wastewater 003 from the vaporization unit 300 and can provide for the mixing of the un-vaporized wastewater 003 with raw wastewater 001 or combined wastewater 005 already present in water collection unit 200. However, it is also contemplated that the un-vaporized wastewater 003 can be directly recirculated through the vaporization unit 300 (e.g., via pumping un-vaporized wastewater 003 from a fluid outlet 104 to a water distribution system 390 to be dispersed again within the vaporization unit 300, See. FIGS. 3A-3B).

The exemplary water collection unit 200 includes a raw wastewater inlet 210 proximal to top portion 201. The raw wastewater 001 may, for example, enter collection unit 200 through raw wastewater inlet 210 directly from a feed tank, from a gas or oil well, industrial processing site, landfill leachate pool, and/or naturally occurring water source.

Aliquots of raw wastewater 001 to be processed are dispensed through the raw wastewater inlet 210 into the water collection unit 200 using any suitable method, including, but not limited to, via feed pump 101 as shown in FIG. 1. Raw wastewater 001 may be dispensed through the raw water inlet 210 and into the water collection unit 200 at a rate suitable for the materials, equipment, and temperatures utilized. When the water collection unit 200 is utilized in connection with the vaporization system 011, as will be described in connection with FIG. 3B, raw wastewater 001 can be introduced into the water collection unit 200 a rate between about 6 and about 17 gallons per minute "gpm".

The water collection unit 200 can include a conical portion 202 located in the lower region 203. This conical portion 202 aids in the collection of the heavier processed liquid waste 004. In various embodiments, two water outlets 211, 214, a water inlet 212, and a deflection plate 213 are located at the conical bottom portion 202.

Sensors 215 and 217 are depicted as being located at the water collection unit 200. A controller 710 (see FIG. 7) is placed in electronic communication with the sensors 215 and 217. The sensor 215 and controller 710 can detect and/or determine the level of wastewater 001, 005 present within the water collection unit 200 (e.g., the height of wastewater in the water collection unit 200). The controller 710 can automatically manage the transfer of wastewater 001, 003, 005 (e.g., 001, 003, and/or 005) passing into and out of the water collection unit 200, at least in part as a function of the level detected.

The sensor 217 and the controller 710 can detect and/or determine a current concentration of within the wastewater 001, 005 present within the water collection unit 200. For example, the sensor 217 and the controller 710 can detect and/or determine a current concentration of waste present within wastewater 001, 005. The waste can include total dissolved solids TDS, total suspended solids TSS, volatile organic compounds VOCs, and/or other noxious compounds which can be detected and/or determined with one or more sensors. The controller 710 can compare a current concentration of waste present within the wastewater 001, 005 with a predetermined threshold waste concentration. In response to the current concentration being equal to or exceeding the threshold waste concentration, the controller 710 can determine to dispose of the wastewater 001, 005 as processed liquid waste 004. Additionally and/or alternatively, the sensor 217 and the controller 710 can detect and/or determine a concentration of water present within the wastewater 001, 005.

The wastewater 001, 005 is preferably continuously transferred from the collection unit 200 to the vaporization unit 300 through a water outlet 211. Similarly, the un-vaporized wastewater 003 is received into water collection unit 200 from the vaporization unit 300 through a water inlet 212 as described in further detail below.

The water inlet 212 is preferably located below water outlet 211. In locating the water outlet 211 above the water inlet 212, less concentrated i.e., less dense, combined wastewater 005 (e.g., which may require additional processing) is readily dispensed from the water collection unit 200 to the vaporization unit 300 through the water outlet 211, while more concentrated i.e., more dense, combined wastewater 005 will settle toward the bottom of the collection unit 200.

As has been described, the recirculation of un-vaporized wastewater 003 into water collection unit 200 from vaporization unit 300 and of wastewater 001, 005 from the water collection unit 200 to the vaporization unit 300 can continue until one or more of the following criteria are met: 1.) until the combined wastewater 005 or un-vaporized wastewater 003 contains a predetermined concentration of one or more of total dissolved solids TDS, total suspended solids TSS, hydrocarbons, volatile organic compounds VOCs, and/or other noxious compounds; 2.) until a predetermined amount of time has passed; 3.) until the source of available raw wastewater 001 is depleted; 4.) until only a minimum amount of combined wastewater 005 remains; 5.) until the wastewater 001, 005 in the water collection unit 200 exceeds a predetermine level (e.g., height in the tank); and/or 6.) until other criteria are met as will occur to those skilled in the art. The resulting processed liquid waste 004 is then released from the water collection unit 200 through the water outlet 214 using any suitable means e.g., such as via gravity feed, with a pump, or with another transfer device as will occur to a person of skill. The processed liquid waste 004 can be transferred through the water outlet 214 to be released to a storage tank, transport tank, or other destination, all as will occur to those skilled in the art.

FIG. 3A depicts a cross-sectional view of an exemplary vaporization system 009. The vaporization unit 300 of wastewater processing system 100 can take the form of the vaporization system 009. The vaporization system 009 includes a cylinder 301. The cylinder 301 is at least partially defined by a top wall 303 and a bottom wall 304 which are connected by a contiguous wall 302.

The cylinder 301 is depicted as including an upper portion and a lower portion. The upper portion includes a vapor chamber 305 and the lower portion includes a separation chamber 306. The vapor chamber 305 is located between the contiguous wall 302 of the cylinder 301 and walls 307 of the burner tube 360. The vapor chamber 305 is located above the separation chamber 306 and can be separated from separation chamber 306 by a permeable substrate (e.g., which allows water and vapor to readily pass therethrough). An exemplary permeable substrate is grating 308.

As the vapor chamber 305 and the separation chamber 306 remain at substantially atmospheric pressure, the vapor chamber 305 and the separation chamber 306 do not need to be constructed or maintained as pressure vessels. Therefore, compliance with ASME and/or API pressure vessel codes should not be required for the vaporization system 009.

The phrase "at substantially atmospheric pressure" is intended to encompass a range of pressures from around −15 PSIG (negative fifteen pounds per square inch, gauge) to around 30 PSIG (thirty pounds per square inch, gauge). Such pressures are believed to be sufficiently close to atmospheric pressure as to not require a pressure vessel, as would be understood to a person of skill. In one non-limiting form, the vapor chamber 305 and the separation chamber 306 can operate at pressures in the range of 0 PSIG to 7 PSIG.

A burner 350 can serve as a heat source for the vaporization system 009. The burner 350 is disposed proximal to the top wall 303 of the cylinder 301. A burner tube 360 extends from the burner 350 through the top wall 303 of cylinder 301, into and through the vapor chamber 305, through the grating 308 and partially into the separation chamber 306. The burner 350 receives and ignites a fuel. The ignited and combusting fuel, and the hot exhaust gas, are expelled into the burner tube 360.

A variety of gaseous and liquid fuels can be utilized by burner 350. It is believed that gaseous fuels such as propane, methane, and natural gas (including flare gas), may be preferable for many applications due to a ready availability thereof. The burner 350 can take a variety of forms as will occur to a person of skill in the art, including as a dual or multiple fuel burner 350 (e.g., which can combust different gaseous and/or liquid fuels) or as a single or dedicated fuel burner 350.

A blower 370 is configured to provide air to the burner 350 (e.g., enabling combustion) and to blow the exhaust gases and hot air (depicted in FIG. 3A as downward arrows "D") from the burner 350 into and through the burner tube 360. The exhaust gases and hot air are expelled from the burner tube 360 out into separation chamber 306. In some embodiments, the blower 370 is from PENNBARRY of Plano, Tex. USA and has a "silencer" built in to reduce the amount of sound produced. However, a variety of blowers 370 may be utilized herein, as would be understood to a person of skill. The force of blower 370 causes heated exhaust gases to deflect from a bottom wall 304 of the separation chamber 306 or from any un-vaporized wastewater 003 that has collected there, to rise up through grating 308 and through the vapor chamber 305 (depicted in FIG. 3A as upward arrows, labeled "U").

Raw wastewater 001, un-vaporized wastewater 003, or combined wastewater 005 can be introduced into the vaporization unit 300 through one or a plurality of water inlet ports 380 proximal to the top of the vaporization unit 300. This wastewater 001, 003, 005, passes through the water distribution system 390 that disperses the wastewater inside vapor chamber 305. The wastewater 001, 003, 005 which is dispersed into the vapor chamber 305 is depicted as falling wastewater droplets 20. The water distribution system 390 will be described herein in connection with FIGS. 4A-4C.

The burner tube 360 extends from burner 350 through top wall 303 of cylinder 301, into and through vapor chamber 305, through grating 308. As the burner tube 360 is configured to transport heated exhaust and combustion air gases (depicted in FIG. 3A as downward arrows "D"), the burner tube 360 is preferably constructed from a suitable high temperature material, and it may be desirable to provide various safeguards to prevent the burner tube 360 from deteriorating and/or failing due to the repeated exposure to alternating temperatures, thus experienced repeated occurrences of the materials forming burner tube 360 expanding and contracting, as well as vibrations associated with operation of blower 370 and other components of the system 100.

The wastewater processing system 100 vaporizes wastewater 001, 003, 005, by exposing the wastewater 001, 003, 005 to heat within the wastewater processing system 100. For example, with regard to the vaporization system 009 of FIG. 3A, heated exhaust gases traveling through burner tube 360 heat the walls 307 of burner tube 360. The wastewater droplets 020 which contact or pass close to the walls 307 of the burner tube 360 may absorb heat therefrom.

The wastewater droplets 020 falling through the vapor chamber 305 and falling down through the separation chamber 306 may absorb heat from heated exhaust gas (depicted in FIG. 3A as upward arrows, labeled "U") which has deflected from the bottom wall 304 of the separation chamber 306, and/or has deflected from any un-vaporized wastewater 003 that has collected in the separation chamber 306, and that rises up through the grate 308 and through the vapor chamber 305.

The un-vaporized wastewater 003 collected in the separation chamber 306 may absorb heat from heated exhaust gas that is exiting the burner tube 360. This heated exhaust gas can contact the surface of un-vaporized wastewater 003 (downward-moving exhaust gas being depicted in FIG. 3A as downward arrows, labeled "D"). Exposure of wastewater 001, 003, 005, to heat at one or more of these locations causes at least a portion of the wastewater 001, 003, 005 to vaporize into vapor 010. Vapor 010 can exit the vaporization unit 300 to pass into the atmosphere through one or more vents 340 (e.g., depicted as two vents 340 in FIG. 3A) and stacks 361, 362. In some embodiments, an exhaust fan is included within or adjacent to the at least one vent 340 to assist with drawing vapor 010 out of the vent 340.

As will be understood to a person of skill, the term "chamber" refers to a cavity or space which is at least partially enclosed. For example, as has been described herein the separation chamber 306 and the vapor chamber 305 are not fully enclosed; rather, the separation chamber 306 is in flow communication with the vapor chamber 305, the burner tube 306 is in flow communication with the separation chamber 306, and the vapor chamber 305 is in flow communication with the atmosphere (e.g., via the vent 340).

FIG. 3B depicts a cross-sectional view of another exemplary vaporization system 011. The vaporization unit 300 of wastewater processing system 100 can take the form of the vaporization system 011. The vaporization system 011 is depicted as an alternative form to the vaporization system 009; however, it is contemplated that various components, features, and/or subunits from vaporization systems 300, 009, 011, and 900 can be interchanged, combined, removed, and/or modified in a variety of manners, as would be understood to a person of skill. The vaporization system 011 can include a similar structure to the vaporization system 009 and can include similar features as the vaporization system 009, except as will be set forth herein.

The vaporization system 011 includes an ignition source which is configured to provide for the ignition of volatile compounds and/or hydrocarbons within the chamber 042. The volatile compounds can be volatile organic compounds. In the vaporization system 011, the ignition source is depicted as taking the form of flame 014, which is introduced into the chamber 042. The flame 014 can interact with the vapor 010 (e.g., the vaporized wastewater), the falling wastewater droplets 020, and/or the collected un-vaporized wastewater 003 within the chamber 042.

It has been discovered, through highly preliminary testing of the vaporization system 011, that the introduction of the flame 014 into the chamber 042 can result in a reduction of volatile organic compounds and hydrocarbons which are released to the atmosphere in exit vapor 012. It is believed that this reduction results from the ignition, combustion, and incineration of at least some of the hydrocarbons and/or volatile compounds which are present within the vapor 010. The destruction of some of the hydrocarbons and/or volatile compounds present within the vapor 010 (e.g., via ignition, combustion, and incineration) provides exit vapor 012.

The vaporization system 011 is depicted as taking the form of a cylinder 301. The cylinder 301 is defined by a contiguous wall 302 which connects a top wall 303 of cylinder 301 to bottom wall 304 of cylinder 301. A chamber 042 is at least partially defined by the contiguous wall 302 of the cylinder.

The chamber 042 includes an upper region and a lower region. The upper region can take the form of a vapor chamber 021 and the lower region can take the form of a collection chamber 040. The vapor chamber 021 is depicted as being located between the contiguous wall 302 of the cylinder 301 and the walls 007 of a burner tube 013. The collection chamber 040 is depicted as being located below the vapor chamber 021.

The vapor chamber 021 can be separated from collection chamber 040 by a permeable substrate which allows water and vapor to readily pass therethrough. This permeable substrate is depicted as a grating 308; however, a variety of permeable substrates, including various meshes, are contemplated herein.

Similar to vaporization system 009, the vaporization system 011 utilizes heat to vaporize a portion of the dispensed wastewater 001, 003, 005. The wastewater 001, 003, 005, can be dispensed into the system via the water distribution system 390 or through other fluid introduction systems as would be known to a person of skill.

The flow of wastewater 001, 003, 005 through the exemplary vaporization system 011 will now be described. The water distribution system 390 can be utilized to expel wastewater droplets 020 into the vapor chamber 021. The force of gravity moves the wastewater droplets 020 downwardly through the vapor chamber 021 and the collection chamber 040. As will be described hereinafter, the wastewater droplets 020 can contact and interact with a vaporization medium 017 (e.g., pall rings 500) located in the vapor chamber 021.

Wastewater droplets 020 which were not vaporized in the vapor chamber 021 will pass through the grating 308 and will fall downwardly into the collection chamber 040. Some of the wastewater droplets 020 will vaporize (e.g., into vapor 010) as they move downwardly through the collection chamber 040. Wastewater droplets 020 which remain un-vaporized as they travel through the collection chamber 040 collect above the bottom wall 304 of the collection chamber 040 as un-vaporized wastewater 003.

The vaporization system 011 includes a burner, depicted as burner 350, and a blower, depicted as blower 370 (as were described with regard to FIG. 3A). It is contemplated that the burner 350 and blower 370 can take a variety of forms through which flame 014 can be discharged into the collection chamber 040.

The burner tube 013 extends from the burner 350 through the top wall 303 of cylinder 301 and can extend through the vapor chamber 021. Flame 014 is expelled from a discharge 016 at a distal end 022 of the burner tube 013 into the collection chamber 040. The distal end 022 of the burner tube 013 can extend through the grating 308 and into the collection chamber 040.

The burner 350 provides an ignited fuel into the burner tube 013. The blower 370 blows the ignited fuel through the burner tube 013, out of the discharge 016, and into the collection chamber 040. The blower 370 also serves to provide air for the combustion of the fuel. The vaporization system 009 and the vaporization system 011 are both depicted as utilizing burner 350 and blower 370; however, various control parameters for the burner 350 and the blower 370 may need to be adjusted and/or altered to discharge the flame 014 into the collection chamber 040 (e.g., the fuel flow rate to the burner 350, the air flow rate of the blower 370, and other control parameters as would be understood to a person of skill).

Preferably, the flame 014 can serve as the source of heat for the vaporization system 011 (e.g., to vaporize a portion of the dispensed wastewater 001, 003, 005) as well as serving as the ignition source (e.g., to ignite and combust one or more hydrocarbons and/or volatile organic compounds). However, it is also contemplated that a separate ignition source and heat source may be utilized (e.g., exemplary heat sources can include various burners, resistance heaters, heat pumps, etc. and exemplary ignition sources can include various spark, flame 014, or other ignition sources as are known).

Figure 8:
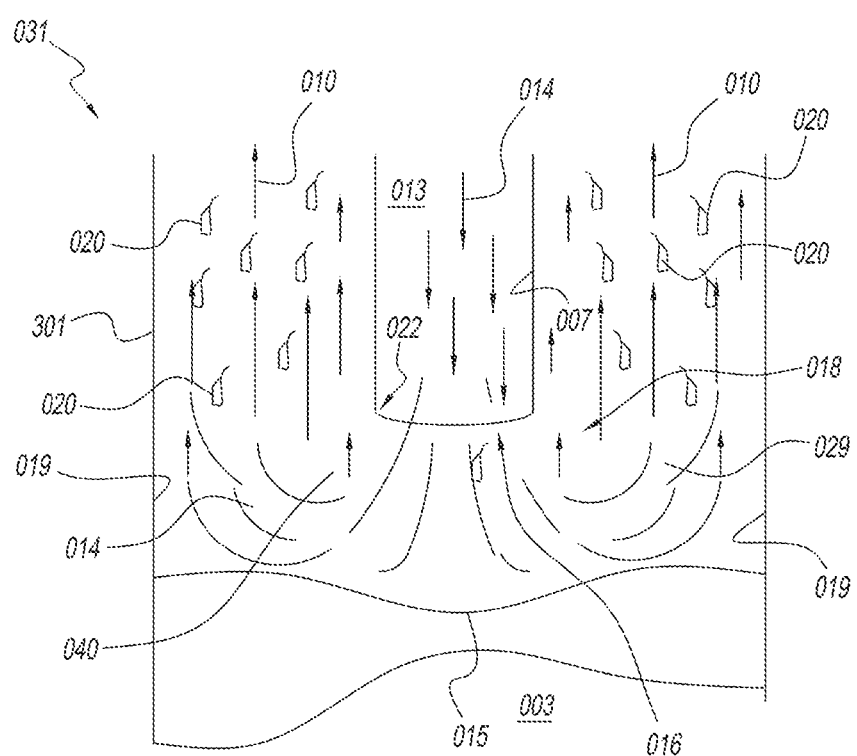
FIG. 8 is an enlarged view of the expansion chamber of the vaporization system of FIG. 3B.

Referring now to FIGS. 3B and 8, an exemplary flame 014 flow path through the vaporization system 011 will now be described. FIG. 8 is an enlarged view of the area 031 from FIG. 3B, which depicts the flame 014 in the collection chamber 040 as during operation. It is to be understood that although specific temperatures and ranges are described hereinafter, such temperatures and ranges are solely intended to be exemplary and are to be construed as non-limiting. The use of a variety of temperatures and/or temperature ranges is contemplated herein. Additionally, although an exemplary flow path of the flame 014 will be discussed hereinafter, it is contemplated that the ignition source (e.g., such as flame 014) can be disposed in a variety of locations in the vaporization system 011 to provide for the combustion of at least some of the hydrocarbons and/or volatile compounds therein.

The flame 014 is expelled from the discharge 016 into the collection chamber 040. The flame 014 can include a temperature in the range of 500° F. to 3500° F. when exiting the discharge 016. The flame 014 can include a temperature in the range of 1000° F. to 2500° F. when exiting the discharge 016. In one specific form, the flame 014 can include a temperature in the range of 1600° F. to 1800° F. at the discharge 016.

Preferably, the collection chamber 040 serves as an expansion chamber 018 for the flame 014. The collection chamber 040 can include a sufficiently large internal volume for the ignited and combusting fuel (e.g., generating the flame 014) to expand and fully combust (e.g., interacting with the air supplied by the blower 370) within the collection chamber 040, resulting in the conversion of the fuel and flame 014 into heated exhaust gas. The blower 370 quickly propels the flame 014 thorough the burner tube 013 to the collection chamber 040 for the fuel to be fully combusted. In one non-limiting form, the blower 370 can pressurize the burner tube 013.

Preferably, the flame 014 contacts an upper surface 015 of the un-vaporized wastewater 003. This contact with the upper surface 015 can serve to direct the flame 014 outwardly toward an inner wall 019 of the collection chamber 040 (as best shown in FIG. 8). The flame 014 contacts and interacts with the upper surface 015 of the un-vaporized wastewater 003, and heat is absorbed from the flame 014 by the un-vaporized wastewater 003.

The flame 014 flows upwardly toward the vapor chamber 021. Some of the flame 014 can contact the inner wall 019 of the collection chamber 040, to then be directed by the inner wall 019 toward the vapor chamber 021. If the flame 014 has a temperature in the range of about 1600° F. to about 1800° F. at the discharge 016, the flame 014 can include a temperature in the range of about 900° F. to about 1100° F. after contacting the upper surface 015 when rising (e.g., depicted at 029) toward the vapor chamber 021. The drop in flame 014 temperature is believed to be due in part to the amount of heat absorbed by the un-vaporized wastewater 003.

Although it is contemplated that the flame 014 can enter the vapor chamber 021, preferably the combusting fuel (e.g., generating the flame 014) is fully combusted in the collection chamber 040. In this manner, heated exhaust gases produced by flame 014 will rise upwardly into the vapor chamber 021 flowing through the vaporization medium 017.

The vapor chamber 021 and the collection chamber 040 remain at substantially atmospheric pressure during operation of the vaporization system 011. This is believed to be highly advantageous as maintaining the vapor chamber 021 and the collection chamber 040 at substantially atmospheric pressure can eliminate the need for the chamber 021, 040 to be constructed as pressure vessels.

As will be appreciated to a person of skill, the vapor chamber 021 and the collection chamber 040 can be maintained at substantially atmospheric pressure by providing sufficient flow out of the system to enable a mass flow rate out of the vaporization system 011 to equal the mass flow rate into the vaporization system 011. For example, the vaporization system 011 can include one or more of the following features: the burner tube 013 can have a smaller flow area than a flow area of the vapor chamber 021; the collection chamber 040 can include a sufficiently large volume to serve as the expansion chamber 018 for the flame 014; the vent(s) 340 in flow communication between the vapor chamber 021 and the atmosphere can include a large flow area relative to the flow area of the burner tube 013; and the volume of air supplied by the blower 370 and the amount of fuel provided by the burner 350 can be considered and accounted for when designing the various flow areas of the vaporization system 011.

During operation, wastewater 001, 003, 005, is introduced into the vapor chamber 021 as wastewater droplets 020. The droplets 020 can be sprayed at any vaporization medium 017 in the vapor chamber 021. The droplets will pass downwardly through the vapor chamber 021, and through any vaporization medium 017, via gravity.

The vapor chamber 021 receives heat from the flame 014 which transfers through the walls 007 of the burner tube 013 and heat from the exhaust gases and vapor 010 as they rise upwardly through the vapor chamber 021. The heated exhaust gases and vapor 010 flow around and/or through any vaporization medium 017 (e.g., pall rings 500) located in the vapor chamber 021, heating the pall rings 500.

The wastewater droplets 020 can interact with the pall rings 500 (e.g., some wastewater droplets 020 being vaporized upon contact with the pall rings 500, other wastewater droplets 020 contacting and flowing on an outer surface of the pall rings), and the pall rings 500 can serve to increase the amount of time the falling wastewater droplets 020 spend within the vapor chamber 021 and can introduce turbulence into the upward flow of heated exhaust gases and vapor 010.

The pall rings 500 may be at a lower temperature than the exhaust gas and vapor 010, which flow upwardly therethrough. Heat is transferred to the pall rings 500 from the exhaust gas, vapor 010, and can be transferred from the walls 007. Heat is transferred from the pall rings 500 to the wastewater droplets 020. A temperature at an upper and outer portion 027 of the pall rings 500 can be lower than a temperature at an inner and lower portion 028 of the pall rings 500 (e.g., the pall rings 500 which are further away from the expansion chamber 018 and the walls 007 can have a lower temperature). In many applications, the temperature of the incoming wastewater 001, 003, 005 will be less than the exhaust gas temperature in the vapor chamber 021; therefore, the water droplets 020 will cool the pall rings 500 as heat transfers to the water droplets 020.

With regard to the prior example where flame 014 is introduced into the collection chamber 040 at a temperature in the range of about 1600° F. to about 1800° F., a centrally located surface 026 of the pall rings 500 can have a temperature in the range of about 250° F. to about 400° F. It is important to note that this is not necessarily the temperature of the exhaust gas and/or vapor 010 at this location; rather, this is a surface 026 temperature of a centrally located pall ring 500. The use of pall rings 500 is believed to provide an increased rate of heat transfer to the wastewater droplets 020, relative a vapor chamber 021 without vapor medium 017 therein.

It is believed that a substantial portion of the wastewater droplets 020 are vaporized, and turned into vapor 010, in the vapor chamber 021. It is believed that 5% or more of the wastewater 001, 003, 005 introduced to the vaporization system 011 may vaporize in the vapor chamber 021. The crossflow action provided within the vapor chamber 021 is believed to increase the vaporization of the wastewater droplets 020 (e.g., heated exhaust gas flows upwardly in an opposite direction relative to the downwardly moving water droplets 020).

Wastewater droplets 020 that were not vaporized in the vapor chamber 021 will pass through the grating 308 into the collection chamber 040. As is illustrated in FIG. 8, a portion of the un-vaporized droplets 020 can pass through the flame 014 rising up from the surface 015 of the un-vaporized wastewater 003. The contact of these un-vaporized droplets 020 with the flame 014 can result in the vaporization of some of the droplets 020 and the production of vapor 010. Additionally, the flame 014 may combust some of the solids or other noxious compounds within the droplets 020. Any droplets 020 which remain un-vaporized as they pass downwardly through the collection chamber 040 will collect on the bottom wall 304 as un-vaporized wastewater 003.

As was previously discussed, the flame 014 preferably contacts the surface 015 of the un-vaporized wastewater 003. The un-vaporized wastewater 003 can absorb a substantial amount of heat through this flame 014 contact and may boil inside the collection chamber 040. The combination of flame 014 contact and boiling of the un-vaporized wastewater 003 vaporizes a portion of the un-vaporized wastewater 003, and it is likely that various solids and/or noxious compounds within the un-vaporized wastewater 003 may be incinerated by this flame 014 contact, especially those which rise toward the surface 015.

The vaporization system 011 vaporizes a substantial amount of the wastewater 001, 003, 005 introduced into the vaporization system 011. The vapor 010 resulting from the vaporization of wastewater 001, 003, 005 will include a large concentration of water vapor; however, this vapor 010 can also include various undesirable vapors, including volatile organic compounds, various vaporized hydrocarbons, aromatics, and/or other noxious compounds. As has been described herein, the flame 014 introduced into the collection chamber 040 serves as an ignition source for undesirable combustible vapors (e.g., volatile organic compounds, vaporized hydrocarbons, and other combustible noxious compounds) and the undesirable combustible vapors can be incinerated within the vaporization system 011.

Two vents, depicted as stack 361 and stack 362, are in flow communication with the vapor chamber 021. The exit vapor 012, which has been discovered to be low in volatile organic compounds, can pass through the stacks 361, 362, through the outlets 030 and into the atmosphere.

Figure 4A:
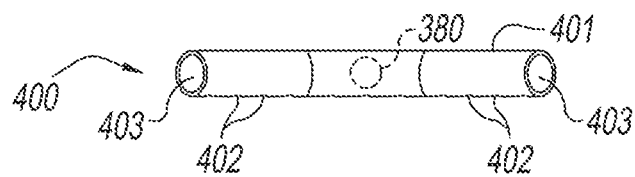
FIGS. 4A and 4B are schematic depictions of exemplary water introduction components.
Figure 4B:
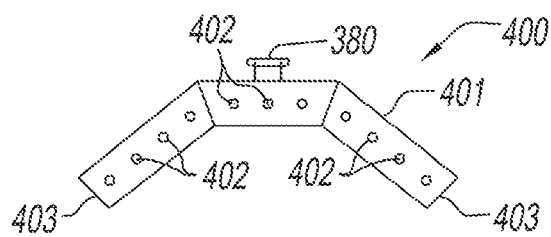
Figure 4C:
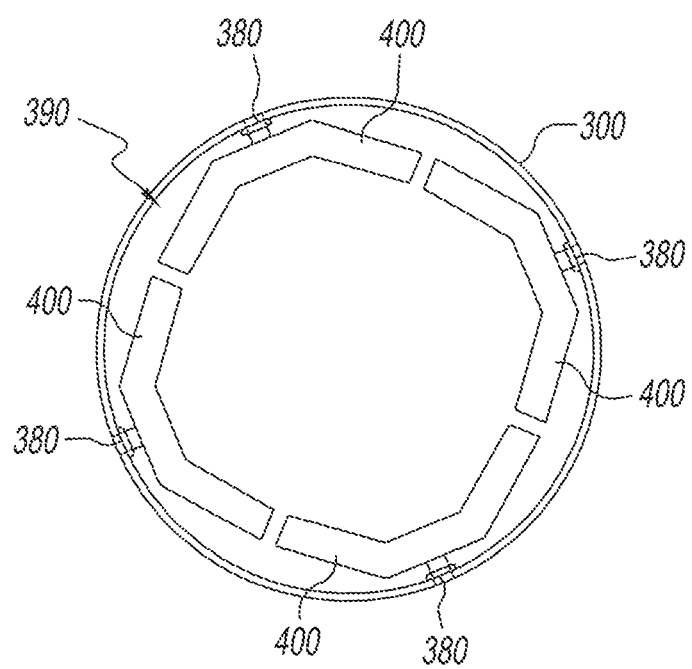
FIG. 4C is a schematic cutaway top view of the vaporization system of FIG. 3B, shown with the water introduction components of FIG. 4A installed.

FIGS. 4A-4C depict an exemplary water distribution system 390 which can be utilized within the vaporization systems 009, 011 as have been described herein. FIG. 4A depicts a front view of a water distribution subunit 400 of the water distribution system 390. The water distribution subunit 400 includes a pipe 401 that is fluidly connected with a water inlet port 380. The pipe 401 is perforated with a plurality of holes 402. The pipe 401 has open ends 403. In use, wastewater 001, 003, 005 enters the pipe 401 through the water inlet port 380, flows through the pipe 401, and exits the pipe 401 through the plurality of holes 402 and/or through the open ends 403 of pipe 401. The wastewater droplets 020 then fall downwardly into and through the vapor chamber 305 (e.g., due to the force of gravity acting upon the wastewater droplets 020).

FIG. 4B is a bottom plan view of the water distribution subunit 400. The subunit 400 may comprise a pipe 401 that is bent to mimic or approximate the inside curvature of the contiguous wall 302 of the cylinder 301. Alternative configurations of the water distribution system 390 to introduce wastewater 001, 003, 005 into the vapor chamber 305, preferably as wastewater droplets 020, will occur to those skilled in the art in view of this disclosure.

FIG. 4C depicts a top cross-sectional view looking down into the vaporization unit 300, which is depicted as taking the form of vaporization system 009. A series of water distribution subunits 400, such as the one shown in FIG. 4B, may be distributed around the inside of the contiguous wall 302 of the cylinder 303 in order to distribute wastewater 001, 003, 005 fairly evenly inside the vapor chamber 305.

Figure 5:
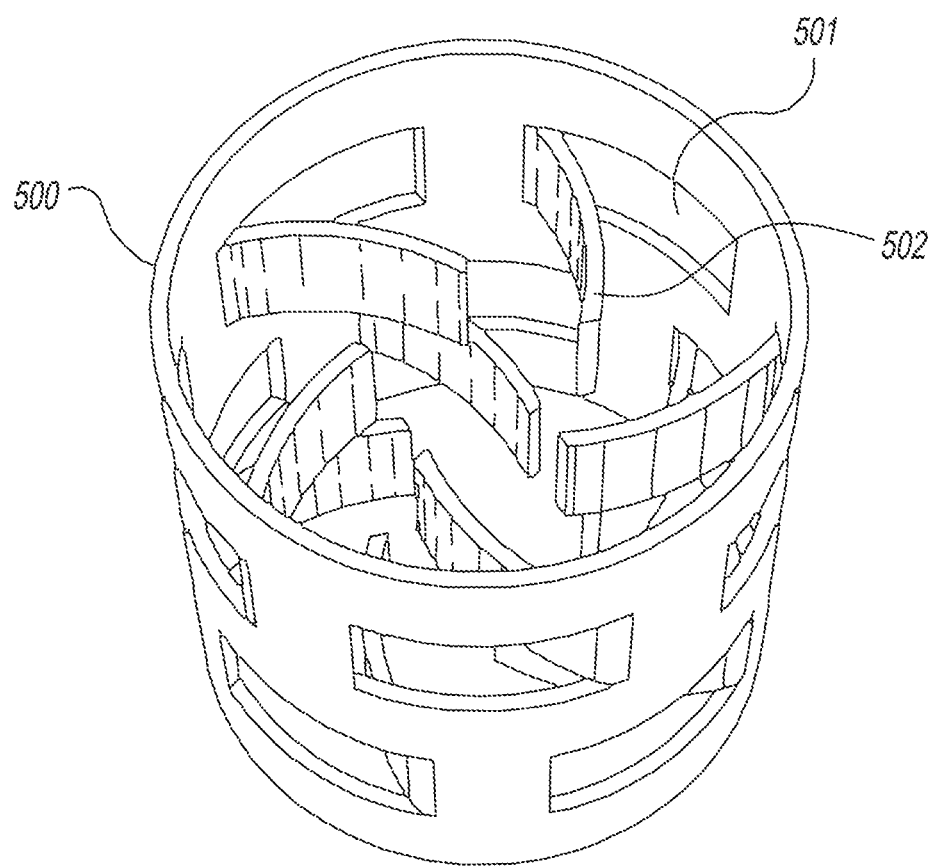
FIG. 5 depicts an exemplary pall ring.

Referring now to FIGS. 3A-3B and 5, to prolong the exposure time of the wastewater droplets 020 to the heated exhaust gases in the vapor chambers 305, 021 a vaporization medium 017 can be placed within the vapor chambers 305, 021. This vaporization medium 017 can also serve to provide a large, heated surface area, heated by the exhaust gases rising upwardly, for the wastewater droplets 020 to contact and absorb heat from.

This vaporization medium 017 can take the form of one or more baffles. As is illustrated in FIGS. 3A-3B, the vaporization medium 017 can take the form of a plurality of pall rings 500. The plurality of pall rings 500 can be located in the vapor chambers 305, 021 and can at least partially fill the vapor chambers 305, 021. One exemplary pall ring 500 is depicted in FIG. 5. This pall ring 500 is a CHRISTYPAK metal pall ring distributed by Christy Catalytics, of St. Louis, Mo. This exemplary pall ring 500 is constructed of 304 stainless steel and has a nominal outer diameter of 1.5". This exemplary pall ring 500 is a substantially hollow cylinder which has a plurality of openings 501 and protrusions 502.

When located in the vapor chambers 305, 021, these pall rings 500 can absorb and retain heat from the heated exhaust gas passing through the vapor chambers 305, 021, can induce turbulence in the heated exhaust gas, and can greatly increase the heated surface area to which the wastewater droplets 020 passing therethrough are exposed. This heat retention, turbulence, and increased heated surface area are believed to promote more efficient heat transfer between the heated exhaust gas and the wastewater droplets 020, which may result in an increased vaporization of the wastewater droplets 020.

However, even with the increased turbulence and heat transfer provided by the pall rings 500 in the vapor chambers 305, 021, only a portion of wastewater 001, 003, 005 (which is introduced as wastewater droplets 020) is vaporized into vapor 010 as it passes downwardly through the vapor chambers 305, 021. For example, in some embodiments in which about 50 gpm of combined wastewater 005 is introduced into the vaporization unit 300, only about 6 gpm to 15 gpm of wastewater may be converted into vapor 010. However, as would be appreciated to a person of skill, the vaporization of about 5% to 10% or more of wastewater 001, 003, 005 per cycle through the vaporization chambers 305, 021 is a substantial portion of the wastewater 001, 003, or 005.

The un-vaporized wastewater 003 can collect in the collection chamber 040 of the vaporization system 011 (FIG. 3B) or in the separation chamber 306 of the vaporization system 009 (FIG. 3A). The presence of un-vaporized wastewater 003 in the collection chamber 040 or separation chamber 306 may provide a number of benefits which include, but are not limited to, serving as a heat shield for the bottom wall 304, enabling the collection and concentration of TDS, TSS, etc. for subsequent processing or disposal, and providing an additional opportunity for the un-vaporized wastewater 003 to be vaporized and/or incinerated (e.g., via the flame 014 directly contacting the un-vaporized wastewater 003 as shown in FIG. 3B).

Advantageously, the wastewater processing system 100 in accordance with the present disclosure vaporizes wastewater 001, 003, 005 without the need to employ pressure vessels and/or to pressurize the vaporization unit 300. Consequently, the vaporization unit 300 may operate at substantially atmospheric pressure, thereby eliminating the dangers, economic cost, and inconvenience that might be associated with pressure vessels.

With continued reference to FIGS. 3A-3B, the level of un-vaporized wastewater 003 in the separation chamber 306 (or the collection chamber 040) can be monitored using an automated sensor 330. Once the level of un-vaporized wastewater 003 is above a predetermined depth, a controller 710 (see FIG. 7) can automatically activate a pump (e.g., 103) to transfer excess un-vaporized wastewater 003 from separation chamber 306 (or the collection chamber 040) back to the water collection unit 200 via water inlet 212 for subsequent processing or disposal.

As the un-vaporized wastewater 003 is heated while it is in vaporization unit 300 as has been described above, when the un-vaporized wastewater 003 is returned to the water collection unit 200 and mixed with raw wastewater 001 or combined wastewater 005 already present in water collection unit 200, further heat transfer occurs. The mixing of the un-vaporized 003 wastewater into the collection unit 200 will thus raise the temperature of the next aliquot of combined wastewater 005 to be transferred to and discharged into the vaporization unit 300, which can increase the vaporization efficiency in further cycles.

As has been discussed, when sufficient raw wastewater 001 or combined wastewater 005 has been vaporized, when or sufficient time has passed, or for other reasons understood by those skilled in the art, the wastewater processing system 100 may be shut down, either automatically via the controller 710 or through manual user control. Depending on the implementation and/or context, wastewater 001, 003, 005 may cease to be delivered to the vaporization unit 300, and the vaporization unit 300 may continue to operate the burner 350 and the blower 370 for a period of time while the wastewater droplets 020 pass through the vapor chamber 305, 021 down to the separation chamber 306 (FIG. 3A) or the collection chamber 040 (FIG. 3B). The burner 350 and the blower 370 can then be turned off, and the un-vaporized wastewater 003 which has collected in separation chamber 306 (FIG. 3A) or the collection chamber 040 (FIG. 3B) can be transferred from the fluid outlet 104 back to the water collection unit 200 via the water inlet 212.

The vaporization system 009, shown in FIG. 3A, comprises a cleaning port 315 in the separation chamber 306. If, for example, un-vaporized wastewater 003 present in the separation chamber 306 becomes saturated with other materials, e.g., if chloride and solids precipitate from the un-vaporized wastewater 003, unwanted deposits may occur inside the separation chamber 306. In these and other circumstances, the cleaning port 315 may be useful to allow ready access into the separation chamber 306 for cleaning and other purposes. The collection chamber 040 of the vaporization system 011 can include a cleaning port (not shown) if desired.

Figure 6:
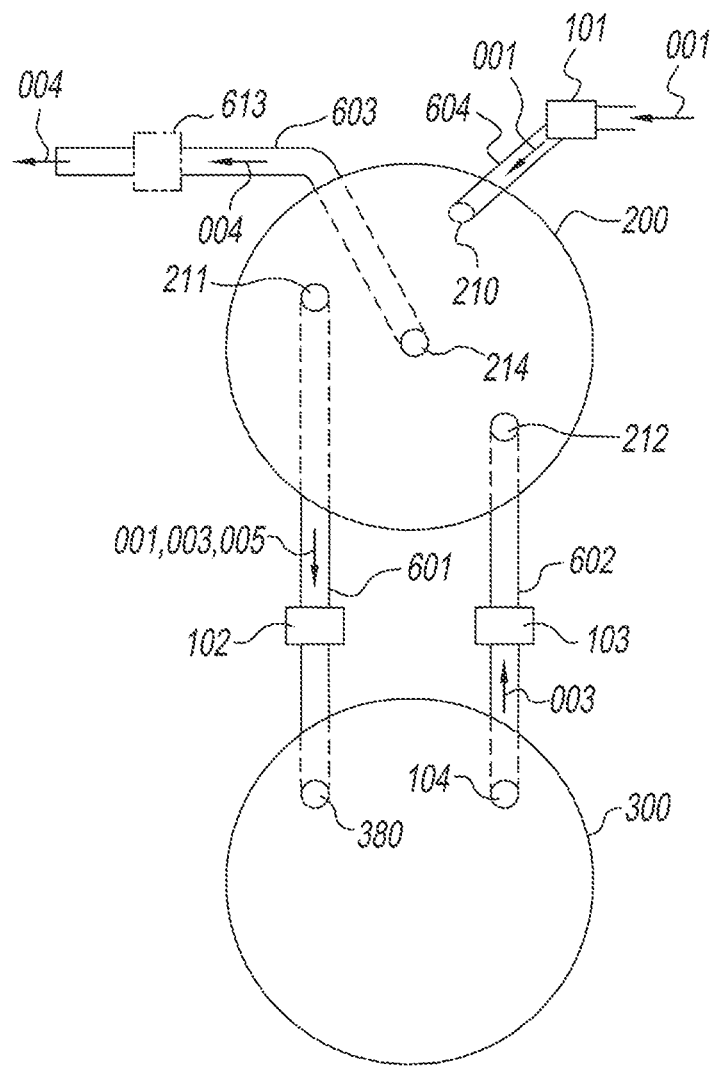
FIG. 6. is a schematic plan view of an exemplary water transfer system of the wastewater processing system of FIG. 1.

FIG. 6 is a top plan view of an exemplary water transfer system 600 for transferring raw wastewater 001, un-vaporized wastewater 003, and combined wastewater 005 between the water collection unit 200 and the vaporization unit 300. The exemplary water transfer system 600 can be used in connection with the mobile processing system 1000, as will be described in connection with FIG. 7 below.

The exemplary water transfer system 600 comprises a series of hoses and/or pipes 601, 602, 603, 604 and pumps 101, 102, 103, and 613. Raw wastewater 001 is pumped from a storage location by a pump 101, through pumping 604, and through raw wastewater inlet 210 into the collection unit 200. Raw wastewater 001, un-vaporized wastewater 003, or combined wastewater 005 is dispensed from the collection unit 200 through the water outlet 211, through the plumbing 601 where it is acted upon by the pump 102, and through the water inlet 380 into the vaporization unit 300.

The un-vaporized wastewater 003 is transferred from the vaporization unit 300 through the fluid outlet 104, through the plumbing 602 where it is acted upon by the pump 103, and through the water inlet 212 into the collection unit 200. Processed liquid waste 004 is removed from the collection unit 200 for storage and/or disposal through the water outlet 214, through plumbing 603 via pump 613. Although a specific water transfer system 600 has been described, it is contemplated that wastewater 001, 003, 005 can be transferred to/from the vaporization unit 300 through a variety of pumps, gravity feeds, or other transfer devices as are known.

Figure 7:
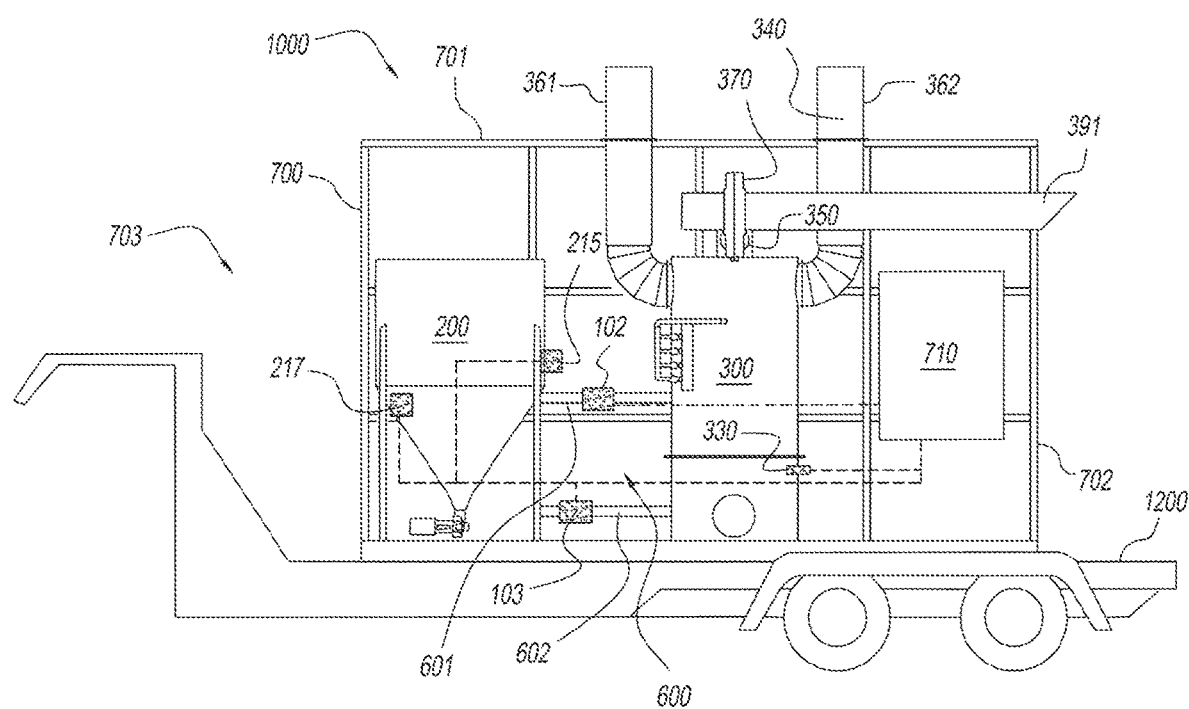
FIG. 7 is a schematic cross-sectional view of an exemplary mobile wastewater processing system.

FIG. 7 is a schematic cross-sectional view of an exemplary mobile wastewater processing system 1000. This mobile wastewater processing system 1000 is depicted as being located on a trailer 1200. The mobile wastewater processing system 1000 includes the vaporization unit 300, burner 350 and blower 370, controller 710 (which can have a controls panel incorporated thereto), can include collection unit 200, and may include water transfer system 600.

The mobile wastewater processing system 1000 can be enclosed within a housing 703. The housing 703 can include a top panel 701, a front panel 700, a rear panel 702, and two side panels (not shown). Stacks 361, 362 of the vents 340 can exit through the top 701 of the housing 703. Vapor 010 or 012 exists the vaporization unit 300 through the stacks 361, 362 and passes into the atmosphere. In some implementations, stacks 361, 362 are "no-loss" stacks that collect heavy compounds, condensate water, and other liquids they encounter into collection unit 200 (as were described in FIG. 8 of U.S. application Ser. No. 17/093,511). However, in further forms, stacks 361, 362 simply allow such materials to escape with the vapor 010 or 012.

In the example shown in FIG. 7, the blower 370 is fluidly connected to a ventilation pipe 391, which extends through the rear panel 702 of the housing 703, where it is exposed to the atmosphere outside of the housing 703. The ventilation pipe 391 is configured to feed the blower 370 with air from the atmosphere.

The housing 703 is depicted as being is disposed on the bed of a commercially available trailer 1200 that may be hauled by a pickup truck; however, it is contemplated that the mobile wastewater processing system 1000, can be mounted on a variety of towable trailers, skids, or other mobile platforms as are known. Advantageously, the mobile wastewater processing system 1000 may be delivered directly to a remote location, such as the site of an oil or gas well or other source of wastewater, where it may be used to process the wastewater as has been described.

Vapor 010 or 012, depending upon if an ignition source such as flame 014 is included in the vaporization unit 300, may be released from wastewater processing system 1000 on site, thus eliminating the requirement to store and/or haul much of the produced wastewater away from the site. By vaporizing the wastewater and releasing the water vapor, raw wastewater 001 may be reduced in volume by up to approximately 95%, leaving only the processed liquid waste 004 in volumes as low as 5% (e.g., $\frac{1}{20}^{th}$) of the original volume of wastewater 001 to be disposed of by conventional measures. Once the wastewater processing at a given site is completed, the wastewater processing system 1000 may subsequently be moved to other sites to process wastewater as needed.

The housing 703 can include a top panel 701, a front panel 700, a rear panel 702, and two side panels (not shown). These panels 701, 700, 702, and the two side panels can be constructed of stainless steel sheets on the interior with a one-inch polystyrene insulation layer and exterior panels of 18-gauge Kynar-coated galvanized steel. The housing 703 can be approximately 8 feet wide, 24 feet long, and 13 feet high 8'×24'×13'; however, the housing 703 can be more compact, especially if the collection unit 200 is not desired. The small overall dimensions of the mobile wastewater processing system 1000 facilitates easier transport and use in numerous applications, especially those in remote locations. However, it is contemplated that the mobile wastewater processing system 1000 can utilize a variety of materials, coatings, and dimensions, and can take a variety of configurations, as will occur to those skilled in the art.

Electrical and electromechanical components of the wastewater processing systems 100, 1000 may be connected to and controlled by a control system. The control system comprises modules to functionally execute steps of processing of raw wastewater 001. The control system may include an operating conditions module, a user request module, a processing control module, an actuation module, and other modules known to those skilled in the art.

The operating conditions module interprets operating conditions, such as temperatures, pressures, water and gas flow rates, presence of unwanted gases, e.g., carbon dioxide, hydrogen sulfide, and the like, by reading various sensor outputs, receiving data messages over a network, and/or through any other method understood in the art. The user request module interprets at least one user request, which, in the present embodiment, includes a target parameter value, for example, a processing target in terms of weight, volume, or other metric or time target. The user request module may process the user request by sending a data message over a network, by comparing an operating condition to a pre-calibrated value, or the like. Without limitation, a user of the request module may be a person, but may also be an application, a computer in communication with the application, and/or a computer in use by a person not shown monitoring the system, and the request may be produced in a direct response to an action by the user, may be scheduled, or may otherwise be programmatically generated as will occur to those skilled in the art.

The control system may further include a network that connects more than one computer to each other and to the control system. Additionally, the network may connect modules within the control system to each other and may connect the control system to the wastewater processing systems 100, 1000. The network may comprise multiple components, for example a LAN, WAN, satellite connection, the internet, and communications within a server and/or computer. Since the control system may allow for the wastewater processing systems 100, 1000 to be controlled remotely, it may eliminate the need for having personnel physically present to operate wastewater processing operations.

The wastewater processing systems 100, 1000 according to the present disclosure may be placed upon a variety of mobile platforms, such as shown in FIG. 7. For example, mobile wastewater processing systems 100, 1000 may placed on a skid or suitable frame structure to be airlifted to remote locations via helicopter or cargo plane. Thus, the wastewater processing systems 100, 1000 may be delivered directly to where raw wastewater 001 is generated, including but not limited to the site of an oil or gas well, industrial processing facility, landfill leachate pool, livestock wastewater holding ponds, and/or other wastewater generating source. Consequently, wastewater processing systems 100, 1000 may eliminate or substantially reduce the need to ship wastewater from sites, and can be especially advantageous at remote sites, thus eliminating or simplifying often complex logistical issues and the associated costs.

In various embodiments, the wastewater processing systems 100, 1000 are powered by fuel present at the production site. For example, electrical power can be provided to the wastewater processing systems 100, 1000 via a generator that operates on either the gas that is being generated at the site or a byproduct of this gas generation (e.g., either natural gas, propane, methane, and/or flare gas), and the fuel used by the burner 350 can be the gas that is being generated at the site or a byproduct of this gas generation.

In various embodiments, the burner 350 is adapted to use any of a plurality of different types of fuel. In one exemplary form, the burner 350 can take the form of a 10 MM BTU MAXON OVENPAK LE EB100 Natural Gas Burner with standard mixing cone, short flame type 310 stainless steel burner sleeve, direct spark with flame rod ignition, all from Honeywell Muncie, Ind. However, a variety of burners 350, including multi-fuel burners and single-fuel burners, may be used in other embodiments as will occur to those skilled in the art.

In various embodiments, the sensors 215 and 330 are radar sensors such as the VEGAPULS 64 distributed by VEGA Grieshaber KG Schiltach, Germany. In other embodiments, other radar sensors or various other types of proximity sensors can be utilized to monitor the levels of wastewater 001, 005 in the bottom of the water processing unit 200 and the level of un-vaporized wastewater 003 in the vaporization unit 300.

The sensor 217 and the controller 710 can detect and/or determine a current concentration of waste present within wastewater 001, 005 within the water processing unit 300. Alternatively, the sensor 217 can be located in the vaporization unit 300 so that it can interact with the un-vaporized wastewater 003 therein. It is contemplated that the sensor 217 can take the form of a conductivity sensor (e.g., to detect TDS or TSS within the wastewaters 001, 003, 005), can take the form of a clarity sensor, and/or can be a specified sensor to detect various volatile organic compounds and/or hydrocarbons. The sensor 217 can also comprise a sensor array.

Figure 9:
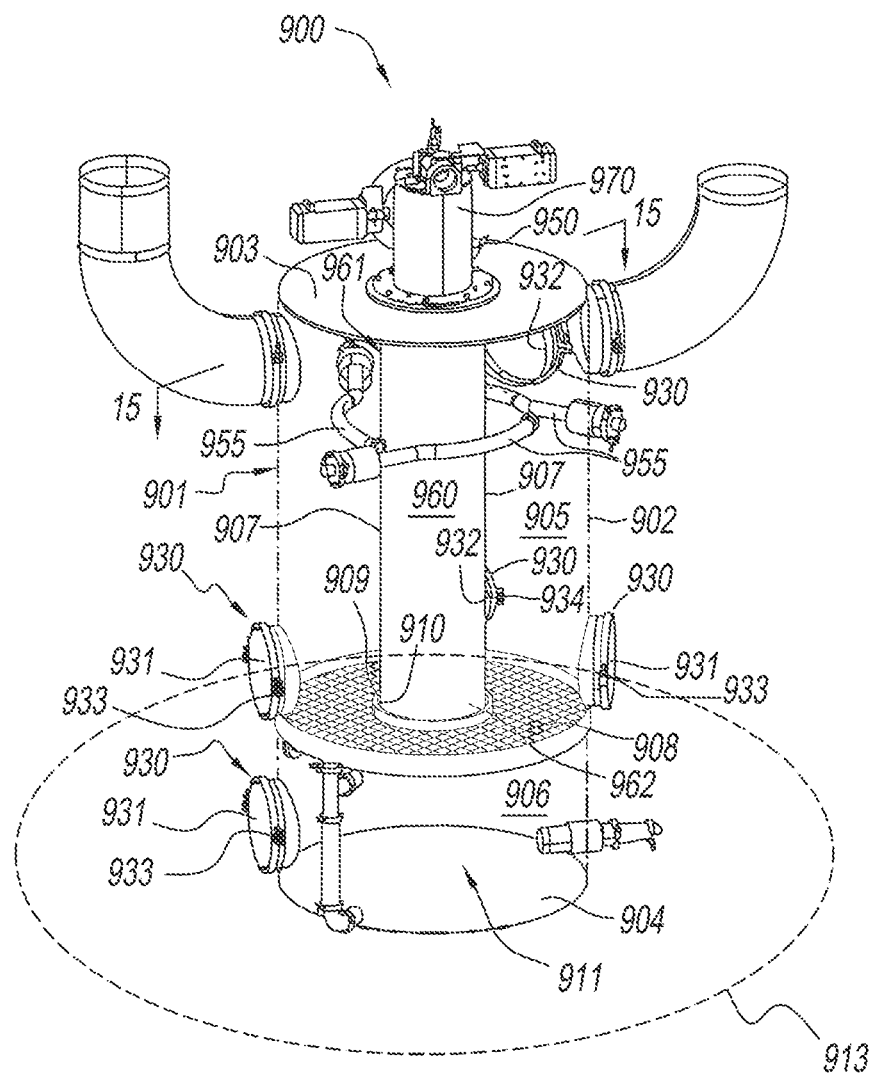
FIG. 9 is a side elevation view of yet another exemplary vaporization system, with the outer cylinder transparent, shown with the pall rings removed.

FIG. 9 illustrates yet another alternative embodiment of the vaporization unit 300, which is depicted as vaporization system 900. The vaporization system 900 includes the same features and functions as the vaporization systems 009, 011, unless otherwise described, and may be utilized as the vaporization unit 300 in the wastewater processing systems 100, 1000.

The vaporization system 900 includes a cylinder 901 defined by a contiguous wall 902 which connects a top wall 903 of the cylinder 901 to a bottom wall 904 of the cylinder 901. The cylinder 901 comprises two internal chambers: the upper vapor chamber 905 and a lower collection chamber 906. The vapor chamber 905 is defined between the contiguous wall 902 of the cylinder 901 and the walls 907 of the burner tube 960. The vapor chamber 905 is disposed above the collection chamber 906 and is separated from the collection chamber 906 by a substrate that allows water and vapor to readily pass therethrough, for example, a grating 908.

Figure 14:
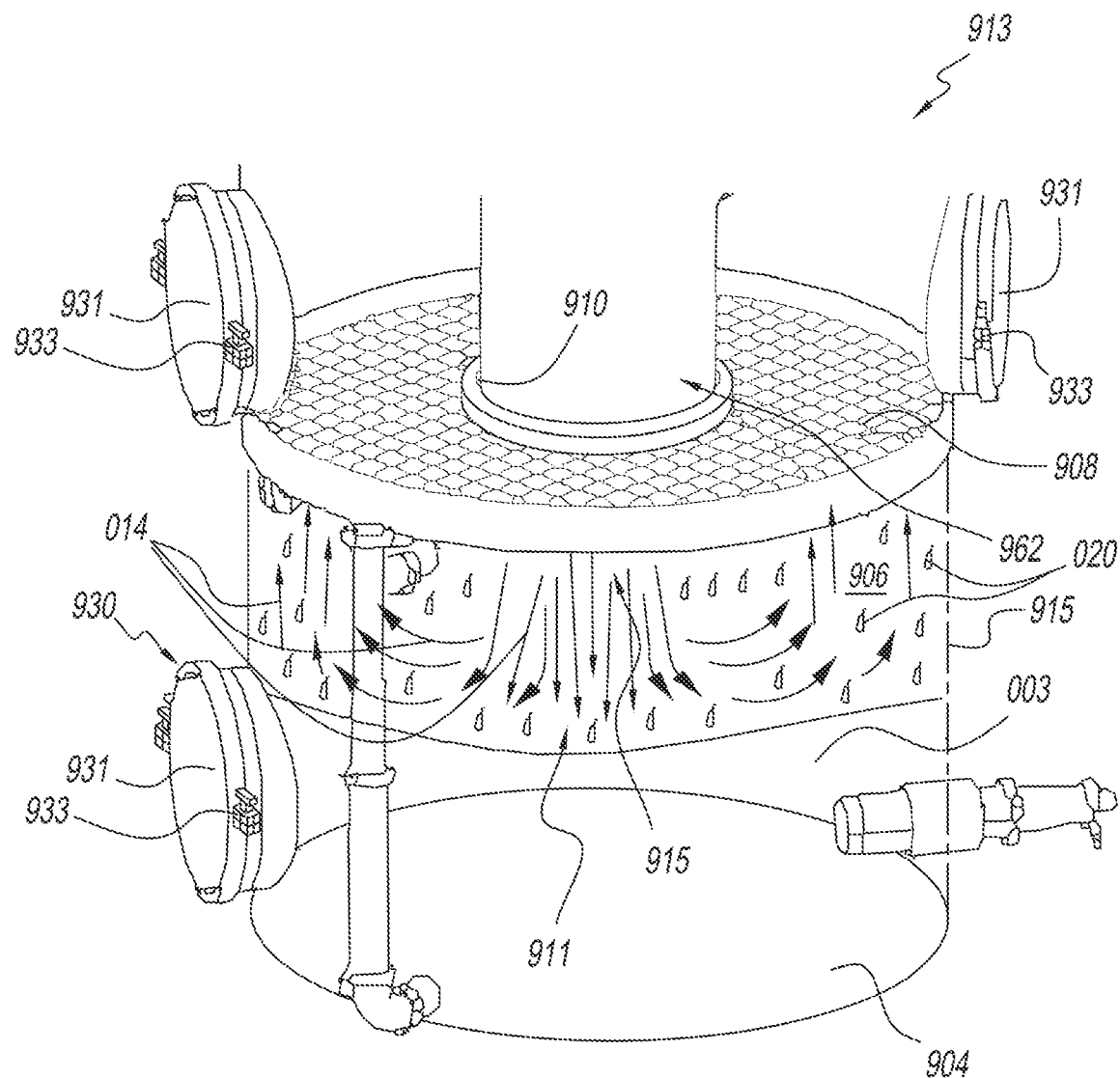
FIG. 14 is an enlarged view of the vaporization system of FIG. 9, depicting the collection chamber during use.

The burner 950 is disposed proximal to the top wall 903 of the cylinder 901. The exemplary burner 950 may be capable of being fueled by any of a variety of types of fuel, such as propane, methane, or natural gas including without limitation flare gas, though some embodiments will use single-fuel burners as will occur to those skilled in the art. The burner tube 960 extends from the burner 950 through the top wall 903 of the cylinder 901, into and through the vapor chamber 905, through the grating 908 and may partially extend into collection chamber 906. Similar to the blower 370, the blower 970 is configured to propel flame 014 from the burner 950 into and through the burner tube 960 and out into the collection chamber 906 (as is best shown in FIG. 14).

The force of blower 970 preferably causes the flame 014 to contact and deflect from the bottom wall of collection chamber 906, and/or from any un-vaporized water that has collected there, and to rise up toward the grating 908. The collection chamber 906 is configured to serve as an expansion chamber 911 for the flame 014 and the fuel generating the flame 014 fully combusts within the expansion chamber 911 and is converted to heated exhaust gas. This heated exhaust gas rises upwardly through the grating 908 and flows upwardly through the vapor chamber 905.

To help to prevent deterioration of the burner tube 960, and to thereby increase the lifespan of the burner tube 960, the burner tube 960 may be configured in a "floating" or suspended position. For instance, the top end 961 may be configured to securely attach to the top wall 903 while the bottom end 962 may be configured to hang freely. In this configuration, the top end 961 may be securely fastened to the top wall 903 using bolts, screws, welds, clamps, or any other common materials or methods for securing top end 961.

In the illustrated embodiment, the grating 908 includes a central opening 909 shaped to receive the bottom end 962 of the burner tube 960 therethrough. To guide the burner tube 960 through the central opening 909 while restricting unwanted movement from the burner tube 960, the central opening 909 may be shaped having a slightly larger diameter in relation to the outer diameter of the burner tube 960 (e.g., but without being too snug as to restrict periodic expanding and contracting of burner tube 960 as temperatures of the materials of the burner tube 960 and grating 908 increase and decrease). As such, it should be understood that the relative sizing of central opening 909, and in particular the amount of expansion gap 910 in relation to burner tube 960, can depend on the expansion properties of the materials forming burner tube 960 and expected temperatures of the application.

The vaporization system 900 includes one or more spray nozzles 955, which perform the same function and replace pipes 401. The spray nozzles 955 are used to spray and disperse the wastewater 001, 003, 005 into the vapor chamber 905 to be processed. Due to the heavy mineral content of the raw wastewater 001 which can be treated, these spray nozzles 955 may be prone to fouling due to accumulation of mineral build-up, debris, and other contaminants in the raw wastewater 001.

To prevent the need to fully shut down the vaporization system 900 to clean the spray nozzles 955, the cylinder 901 of the vaporization system 900 may further include one or more quick-access features 930. Quick-access features 930 may be positioned to allow access to the vapor chamber 905 and/or the collection chamber 906. Periodically, the pall rings that are positioned within vapor chamber 905, such as the stainless-steel pall ring 500 shown in FIG. 5, require removal for cleaning and/or replacement. The quick-access features 930 may provide a user with an efficient way to access the pall rings 500 to perform those functions.

The quick-access features 930 can each include a door 931, such as a hinged door pivotable about a hinge 934, having a securable latch 933 that allows the door 931 to swing open outwardly to provide a user with access to the vapor chamber 905 through a through-hole 932. Alternatively, the door 931 may be able to disconnect entirely from the quick-access feature 930, such as by including more than one latch or clamp 933 to secure the door 931 into place at opposing edges (see FIGS. 10A and 10B).

The door 931 of the quick-access feature 930 may take the form of a separable plate configured to cover the access opening and be securable thereto by tri-clover clamps 933, optionally including a gasket not shown positioned between the door 931 and the edges of the access opening to ensure the quick-access features 930 remain leak-free. As shown, one or more quick-access doors 930 may also be positioned on the cylinder 901 adjacent the collection chamber 906 to provide functions similar to those provided by the cleaning port 315 of the vaporization unit 300.

Figure 10A:
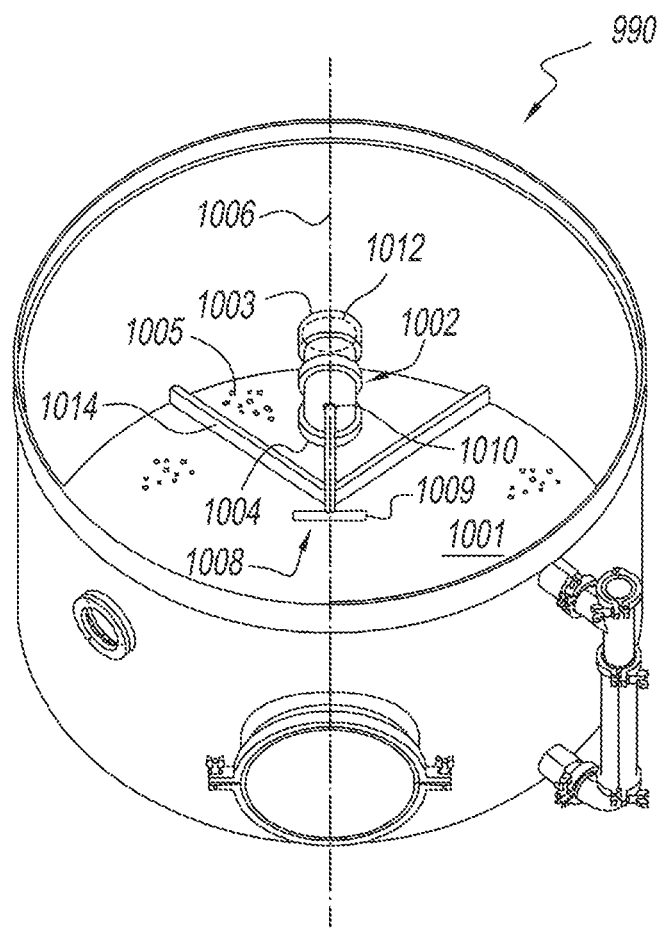
FIGS. 10A and 10B are side elevation views of an alternative exemplary collection chamber, shown with the vapor chamber and burner tube removed for clarity.
Figure 10B:
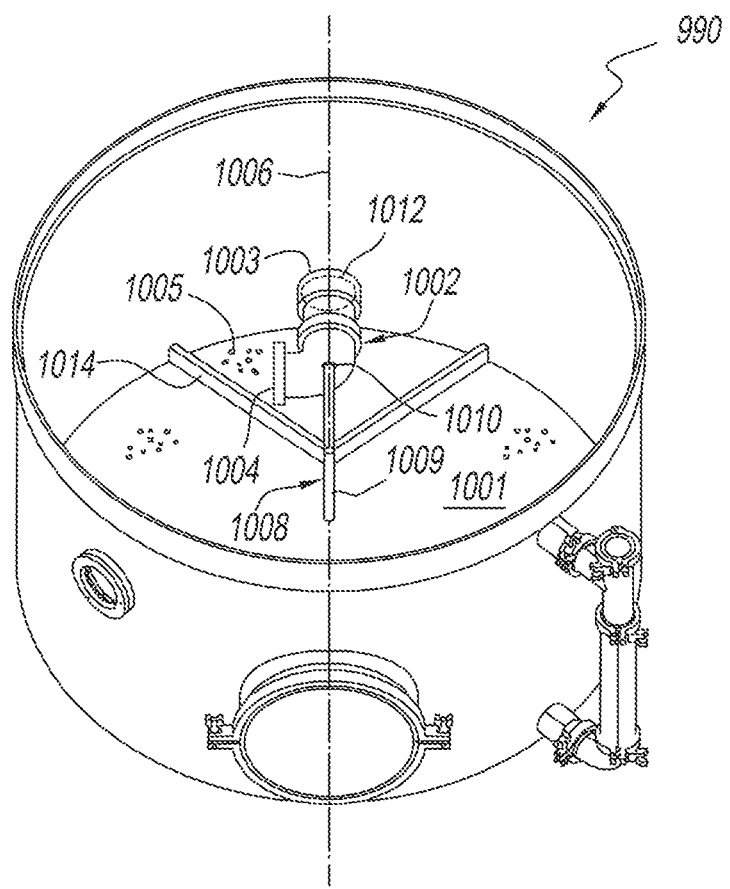

FIGS. 10A-B illustrate a collection chamber 990 of an alternative embodiment. The collection chamber 990 may form the lower portion of the vaporization system 900, in place of collection chamber 906. The collection chamber 990 is shown with the vapor chamber 905 and the burner tube 960 each removed for clarity. The collection chamber 990 includes an elbow pipe 1002 having a first end 1003 defining a fluid exit opening 1012, which is fluidly coupled with exterior piping and configured to function as a fluid outlet similar to the fluid outlet 104, and an open second end 1004 for sucking or otherwise drawing fluid from the lower portion of the collection chamber 990.

In some applications, sediment 1005 may collect on the floor 1001 of the collection chamber 990 during operation. As such, the elbow pipe 1002, which is configured with an "L" or elbow shape, may be rotated about an axis 1006 between first and second rotational positions (as shown in the progression from FIG. 10A to FIG. 10B) defined centrally relative to the fluid outlet opening on first end 1003 to reduce or prohibit sediment from being sucked or otherwise drawn from floor 1001 of the collection chamber 990 and expelled through the opening 1012 via elbow pipe 1002. To rotate the elbow pipe 1002 about the axis 1006, an adjustment rod 1008 may be included with a handle 1009 at one end and a connection feature 1010 at the opposing end. The connection feature 1010 allows the adjustment rod 1008 to be selectively coupled with the elbow pipe 1002 so a user may adjust the angle of the second end 1004 of the elbow pipe 1002 as desired.

To further reduce or prevent sediment 1005 from being expelled from the collection chamber 990 through the elbow pipe 1002, a solids dike 1014 may be included at or near the second end 1004 to block solids from flowing into the second end 1004 while allowing liquids to freely pass.

In some circumstances during operation of the collection chamber 990, fluid may develop a circular swirl relative to the floor 1001 within the collection chamber 990 as un-vaporized wastewater 003 is dispensed through the elbow pipe 1002. To reduce or prevent this fluid swirl, the solids dike 1014 may be further configured to function as a baffle, extending vertically upward from floor 1001, to interrupt the fluid swirl. It should be understood that the dike and baffle 1014 may be formed in a "V" shape as shown to assist with the blocking of solids, or it may be formed in any other shape or have an alternative height from the floor 1001 that would be effective for reducing the fluid swirl and liquid movement within the collection chamber 990 while also preventing solids from entering the elbow pipe 1002.

Figure 11:
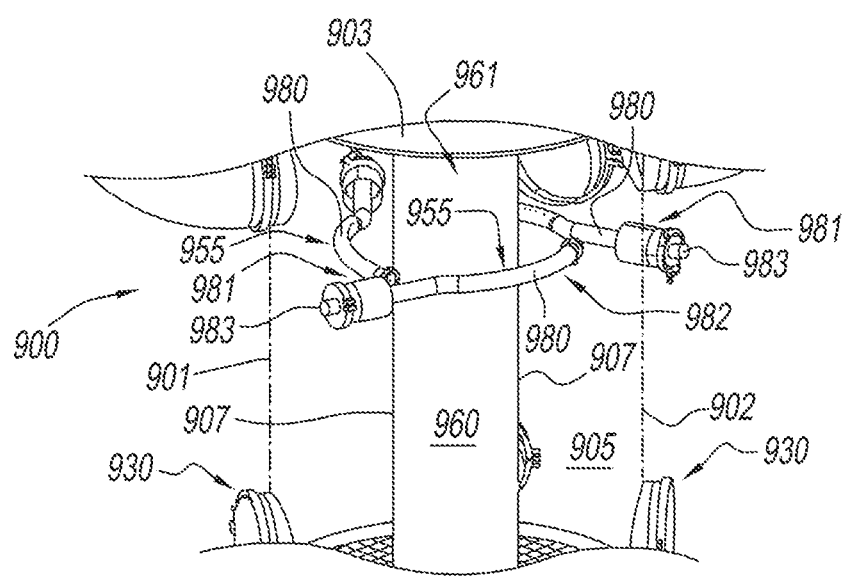
FIG. 11 is a perspective cutaway view of the vaporization system of FIG. 9, depicting the vapor chamber, shown with the pall rings removed.
Figure 12:
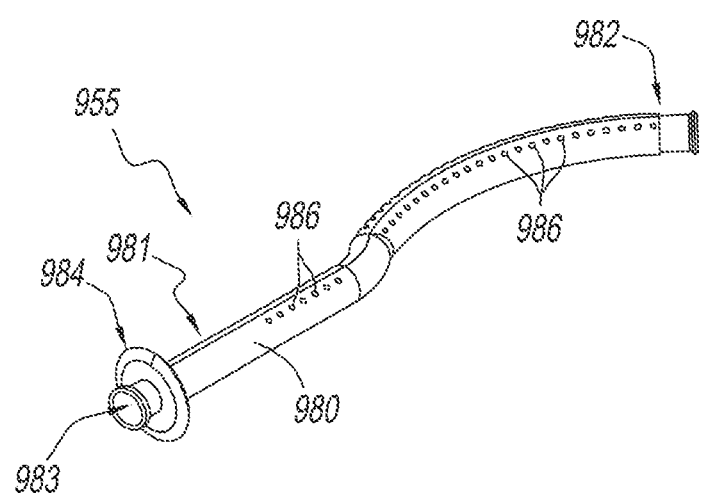
FIG. 12 is a perspective view of one spray rail assembly of FIG. 11, shown removed from the vaporization system.
Figure 13:
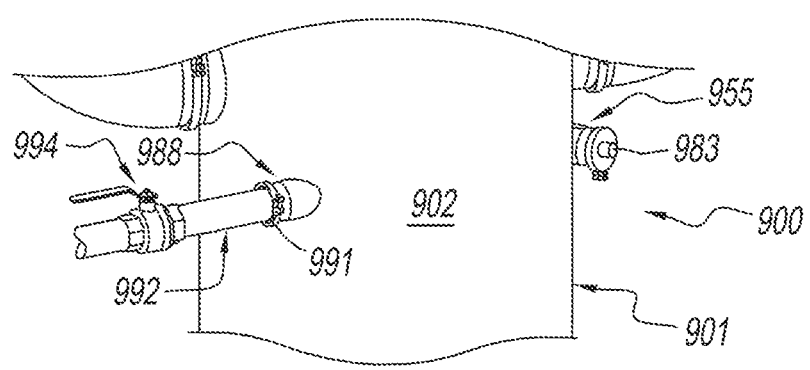
FIG. 13 is a perspective view of the vaporization system of FIG. 9, showing a water supply coupled with one of the spray rail assemblies.

Referring now to FIGS. 11-13, the spray rail assemblies 955 for use with vaporization system 900 will now be described. One or more of the spray rail assemblies 955 may be inserted into the vaporization chamber 905 for introducing wastewater 001, 003, 005 therein. The spray rail assemblies 955 are configured so that they can be easily removed and maintained or replaced, as needed. With reference to FIG. 11, the spray rail assembly 955 comprises a rail pipe 980 with a first end 981 and a second end 982. The spray rail assembly 955 may be hollow to therefore permit wastewater 001, 003, 005 to be transferred through the spray rail assembly 955. Wastewater 001, 003, 005 enters the spray rail assembly 955 at the first end 980 through the water inlet 983. As the wastewater 001, 003, 005 can be pressurized, it is pushed through the rail pipe 981 and through the spray rail assembly 955 to exit the spray rail assembly 955 through the plurality of spray nozzles 986. The second rail end 982 may be a solid cap to prevent the wastewater 001, 003, 005 from exiting the spray rail assembly 955 through the second end 982, or it may incorporate another nozzle 986 at its second end 982.

In some embodiments, the rail pipe 980 of the spray rail assembly 955 includes a curved body to allow for a better fit within the vapor chamber 905. In one example, three spray rail assemblies 955 may be utilized within the vapor chamber 905, with each spray rail assembly 955 configured to curve approximately ⅓ of the distance around the burner tube 960. The curved body of the rail pipe 980 further ensures wastewater 001, 003, 005 expelled from the spray rail assembly 955 is expelled from a central position between the burner tube 960 and the cylinder 901. The curved body of the rail pipe 980 also ensures that one may efficiently insert and remove the spray rail assembly 955 into and from the vapor chamber 905 through its respective access opening. A flange assembly 984 provides a mounting structure for attaching the spray rail assembly 955 to an exterior surface of the cylinder 901. Particularly, the flange assembly 984 is affixed or otherwise secured with the spray rail assembly 955 near the first end 981 of the spray rail assembly 955.

The rail pipe 980 of the spray rail assembly 955 includes a plurality of spray nozzles 986 that are dispersed along the length of rail pipe 980. In one embodiment, the spray nozzles 986 are holes drilled through the surface of rail pipe 980 to allow wastewater 001, 003, 005 from inside rail pipe 980 to spray into vapor chamber 905 via spray nozzles 986 as wastewater droplets 020. It should be understood that, in alternative versions, it may be desired to use replaceable nozzle assemblies or other openings in lieu of drilled holes in rail pipe 980.

As illustrated in FIG. 13, a spray rail wastewater supply line 992 enters the spray rail receiving assembly 988 and is affixed to the assembly 988 by a spray rail assembly clamp 991. The spray rail wastewater supply line 992 further comprises a spray rail water supply shutoff valve 994. In some embodiments, each of the plurality of spray rail assemblies 955 would have its own individual water supply shutoff valve 994. The water supply shutoff valve(s) 994 may be a manually actuated valve, electronically actuated valve, or use alternative or additional. The spray rail assembly clamp 991 may be, for example, a tri-clover type of clamp assembly, or it may be any other type of clamping connector as would occur to one knowledgeable in the art.

FIG. 14 depicts an enlarged view of the area depicted as 913 in FIG. 9. FIG. 14 depicts the collection chamber 906 of the vaporization system 900 as during use. As is illustrated, the flame 014 is expelled from a discharge 915 of the burner tube 960. The collection chamber 906 is configured to serve as an expansion chamber 911. The flame 014 is expelled from the discharge 915 and preferably contacts the un-vaporized wastewater 003. The flame 014 is then directed outwardly to rise upwardly toward the grating 908. Falling wastewater droplets 020 will fall through an interact with the flame 014.

The volume provided by the expansion chamber 911 is preferably sufficient for the fuel generating the flame 014 to fully combust within the expansion chamber 911 (e.g., converting the fuel and flame 014 to heated exhaust gases). These heated exhaust gases then flow upwardly through the grating 908 and into the vapor chamber 905.

While the invention has been described in connection with what is presently considered to be the most practical and preferred embodiment, it is to be understood that the invention is not to be limited to the disclosed embodiments, but on the contrary, is intended to cover various modifications and equivalent arrangements included within the spirit and scope of the appended claims, which scope is to be accorded the broadest interpretation so as to encompass all such modifications and equivalent structures as permitted under the law. Accordingly, the scope of the present invention should be considered in terms of the following claims and is understood not to be limited to the details of structure and operation shown and described in the specification and drawings.

It should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow.

In reading the claims it is intended that when words such as "a," "an," "at least one" and "at least a portion" are used, there is no intention to limit the claim to only one item unless specifically stated to the contrary in the claim. Unless specifically stated to the contrary in the claim, the language "at least one of X, Y, and Z" should be interpreted as including both the conjunctive and disjunctive forms. Specifically, the language "at least one of X, Y, and Z" is intended to encompass the following permutations of X, Y, and Z: X alone; Y alone; Z alone; X and Y; X and Z; Y and Z; and X, Y, and Z. Further, when the language "at least a portion" and/or "a portion" is used the item may include a portion and/or the entire item unless specifically stated to the contrary.

What is claimed is:

1. An apparatus, comprising:
a chamber having an outer wall;
a wastewater introduction port located at an upper portion of the chamber, wherein the wastewater introduction port is configured to distribute wastewater throughout the upper portion;
a burner in flow communication with the chamber, wherein the burner is configured to generate flame to be introduced into a lower portion of the chamber through a burner tube, wherein the flame heats an outer wall of the burner tube; and
wherein a portion of the wastewater is heated by the outer wall of the burner tube and vaporized in the upper portion of the chamber.

2. The apparatus of claim 1, wherein the flame has a temperature in the range of 500° F. to 3500° F. when introduced into the lower portion.

3. The apparatus of claim 2, wherein the flame interacts with at least one volatile organic compound in the chamber to ignite and incinerate the at least one volatile organic compound.

4. The apparatus of claim 2, further comprising a permeable substrate located between the upper portion and the lower portion, wherein the upper portion is an upper region, wherein the lower portion is a lower region, wherein a vaporization medium is located in the upper region, and wherein the wastewater introduction port is configured to expel the wastewater toward the vaporization medium.

5. The apparatus of claim 4, further comprising a vent in flow communication with the upper region of the chamber, wherein the portion of vaporized wastewater is vented to the atmosphere via the vent, and wherein the chamber remains at substantially atmospheric pressure.

6. The apparatus of claim 5, further comprising:
a burner tube extending from the burner through the upper region and toward the lower region, wherein the upper region is defined between the outer wall of the chamber and an outer wall of the burner tube; and
wherein the lower region of the chamber is configured to collect un-vaporized wastewater, wherein the burner tube is configured to direct the flame downwardly at a surface of the collected un-vaporized wastewater, and wherein the flame contacts the surface of the collected un-vaporized wastewater.

7. The apparatus of claim 1, further comprising a vaporization medium located in the upper portion of the chamber, wherein the flame is introduced into the lower portion of the chamber, wherein the lower portion is configured to serve as an expansion chamber for the flame, wherein the fuel generating the flame is fully combusted and converted into heated exhaust gas in the lower portion, and wherein the heated exhaust gas is directed upwardly toward the vaporization medium and flows through the vaporization medium.

8. The apparatus of claim 7, wherein a substantial portion of the wastewater is vaporized in the upper portion, wherein un-vaporized droplets of the wastewater move downwardly from the upper portion into the lower portion, and wherein the flame contacts the un-vaporized droplets as they move downwardly in the lower portion.

9. The apparatus of claim 1, wherein the burner tube is configured to direct the flame toward an un-vaporized portion of the wastewater, wherein the flame contacts an upper surface of the un-vaporized portion.

10. The apparatus of claim 2, wherein the burner tube is configured to direct the flame to contact un-vaporized droplets of the wastewater as the un-vaporized droplets move downwardly through the lower portion of the chamber.

11. The apparatus of claim 2 wherein the lower portion of the chamber is an expansion chamber for the flame.

12. The apparatus of claim 4 wherein the vaporization medium comprises a plurality of pall rings.

* * * * *